(12) United States Patent
Song

(10) Patent No.: US 12,073,070 B2
(45) Date of Patent: Aug. 27, 2024

(54) DYNAMIC ELEMENT CONTROL METHOD, ELECTRONIC DEVICE, AND COMPUTER READABLE STORAGE MEDIUM

(71) Applicant: HONOR DEVICE CO., LTD., Shenzhen (CN)

(72) Inventor: Lang Song, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 17/908,406

(22) PCT Filed: Sep. 14, 2021

(86) PCT No.: PCT/CN2021/118090
§ 371 (c)(1),
(2) Date: Aug. 31, 2022

(87) PCT Pub. No.: WO2022/062949
PCT Pub. Date: Mar. 31, 2022

(65) Prior Publication Data
US 2023/0342018 A1  Oct. 26, 2023

(30) Foreign Application Priority Data
Sep. 24, 2020 (CN) .......................... 202011017632.0

(51) Int. Cl.
G06F 3/0486 (2013.01)
G06F 3/0481 (2022.01)
(52) U.S. Cl.
CPC .......... *G06F 3/0486* (2013.01); *G06F 3/0481* (2013.01)

(58) Field of Classification Search
CPC ............................ G06F 3/0486; G06F 3/0481
See application file for complete search history.

(56) References Cited

U.S. PATENT DOCUMENTS

| 8,898,590 | B2 | 11/2014 | Okada et al. | |
|---|---|---|---|---|
| 10,324,613 | B2 | 6/2019 | Li | |
| 10,509,537 | B2 | 12/2019 | Yoshida | |
| 2012/0169768 | A1* | 7/2012 | Roth ..................... | G06F 3/0486 345/629 |
| 2014/0149903 | A1 | 5/2014 | Ahn et al. | |
| 2014/0365944 | A1 | 12/2014 | Moore et al. | |
| 2014/0380213 | A1 | 12/2014 | Wang | |

(Continued)

FOREIGN PATENT DOCUMENTS

| CN | 103729156 A | 4/2014 |
|---|---|---|
| CN | 103853423 A | 6/2014 |

(Continued)

*Primary Examiner* — Cao H Nguyen
(74) *Attorney, Agent, or Firm* — WOMBLE BOND DICKINSON (US) LLP

(57) ABSTRACT

Disclosed are a dynamic element (25) control method, an electronic device (900), and a computer readable storage medium. (102) A moving operation of a floating window (24) moving toward the dynamic element (25) is detected, and adjustment information of the dynamic element (25) is determined. (108) A location and/or size of the dynamic element (25) is adjusted based on the adjustment information, so that the dynamic element (25) avoids the floating window (24). A visible area of the dynamic element (25) can be increased, and operability of the dynamic element (25) can be improved.

20 Claims, 22 Drawing Sheets

(56) References Cited

U.S. PATENT DOCUMENTS

| | | |
|---|---|---|
| 2015/0234551 A1 | 8/2015 | Yoshida |
| 2016/0034130 A1 | 2/2016 | Li |
| 2017/0340959 A1 | 11/2017 | Tang et al. |
| 2018/0150208 A1 | 5/2018 | Song et al. |
| 2019/0018555 A1 | 1/2019 | Jing et al. |
| 2022/0261119 A1 | 8/2022 | Han et al. |
| 2022/0291816 A1 | 9/2022 | Fan et al. |

FOREIGN PATENT DOCUMENTS

| | | | |
|---|---|---|---|
| CN | 104182121 | A | 12/2014 |
| CN | 104238869 | * | 12/2014 |
| CN | 104238869 | A | 12/2014 |
| CN | 104898953 | A | 9/2015 |
| CN | 105302408 | A | 2/2016 |
| CN | 106201494 | A | 12/2016 |
| CN | 106293315 | A | 1/2017 |
| CN | 106775182 | A | 5/2017 |
| CN | 106775195 | A | 5/2017 |
| CN | 109697010 | A | 4/2019 |
| CN | 110362373 | A | 10/2019 |
| CN | 110647274 | A | 1/2020 |
| CN | 111638818 | A | 9/2020 |
| EP | 2738660 | A2 | 6/2014 |
| EP | 2908232 | A1 | 8/2015 |
| EP | 2988197 | A1 | 2/2016 |
| JP | 2012014648 | A | 1/2012 |
| JP | 2014153831 | A | 8/2014 |
| WO | 2016078568 | A1 | 5/2016 |

\* cited by examiner

DYNAMIC ELEMENT CONTROL METHOD, ELECTRONIC DEVICE, AND COMPUTER READABLE STORAGE MEDIUM

CROSS-REFERENCE TO RELATED APPLICATIONS

This application is a National Stage of International Application No. PCT/CN2021/118090, filed on Sep. 14, 2021, which claims priority to Chinese Patent Application No. 202011017632.0, filed on Sep. 24, 2020, both of which are hereby incorporated by reference in their entireties.

TECHNICAL FIELD

This application relates to the field of human-computer interaction technologies, and specifically, to a dynamic element control method, an electronic device, and a computer readable storage medium.

BACKGROUND

A current electronic device has a function of displaying a floating window, and a floating window function may implement an effect of suspending a window of an application program on an interface of the current application program. If a floating window is displayed on a current interface, a user cannot see and operate information or a button that is blocked by the floating window, causing a problem that a visible area of the information or button is too small, and operability of the information or button is relatively low.

SUMMARY

In view of this, this application provides a dynamic element control method, an electronic device, and a computer readable storage medium, which can increase a visible area of a dynamic element and improve operability of the dynamic element.

According to a first aspect, an embodiment of this application provides a dynamic element control method, including:
  detecting a moving operation of a floating window moving toward a dynamic element, and determining adjustment information of the dynamic element; and
  adjusting a location and/or size of the dynamic element based on the adjustment information, so that the dynamic element avoids the floating window.
In a possible implementation, the adjustment information includes adjustment location information; and
  the determining adjustment information of the dynamic element includes:
  acquiring first location information of the floating window and second location information of the dynamic element; and
  generating the adjustment location information by using a first specified function and based on a specified first boundary value, a specified second boundary value, a specified first parameter, a specified second parameter, the first location information, and the second location information.
In a possible implementation, the first specified function includes a linear function, a sine curve, a Bessel curve, a power function curve, or an exponential function.
In a possible implementation, the adjustment information includes adjustment size information; and
the determining adjustment information of the dynamic element includes:
  acquiring the first location information of the floating window, the second location information of the dynamic element, and current size information of the dynamic element; and
  generating the adjustment size information by using a second specified function and based on a specified boundary size, a specified third parameter, a specified fourth parameter, the first location information, the second location information, and the current size information.
In a possible implementation, the second specified function includes a linear function, a sine curve, a Bessel curve, a power function curve, or an exponential function.
In a possible implementation, a first boundary value is less than a second boundary value; and
  before the adjusting a location and/or size of the dynamic element based on the adjustment information, the method further includes:
  determining whether the adjustment location information is greater than or equal to the first boundary value and less than or equal to the second boundary value; and
  if it is determined that the adjustment location information is greater than or equal to the first boundary value and less than or equal to the second boundary value, continuing to perform the step of adjusting a location and/or size of the dynamic element based on the adjustment information.
In a possible implementation, the method further includes:
  if it is determined that the adjustment location information is less than the first boundary value, determining the first boundary value as the adjustment location information, and continuing to perform the step of adjusting a location and/or size of the dynamic element based on the adjustment information.
In a possible implementation, the method further includes:
  if it is determined that the adjustment location information is greater than the second boundary value, determining the second boundary value as the adjustment location information, and continuing to perform the step of adjusting a location and/or size of the dynamic element based on the adjustment information.
In a possible implementation, before the adjusting a location and/or size of the dynamic element based on the adjustment information, the method further includes:
  determining whether the adjustment size information is greater than or equal to the boundary size; and
  if it is determined that the adjustment size information is greater than or equal to the boundary size, continuing to perform the step of adjusting a location and/or size of the dynamic element based on the adjustment information.
In a possible implementation, the method further includes:
  if it is determined that the adjustment size information is less than the boundary size, determining the boundary size as the adjustment size information, and continuing to perform the step of adjusting a location and/or size of the dynamic element based on the adjustment information.
In a possible implementation, the method further includes:

adjusting a location and/or size of a neighboring dynamic element of the dynamic element based on a specified proportion of the adjustment information.

According to a second aspect, an embodiment of this application provides an electronic device, where the device includes:

a display screen; one or more processors; a memory; and one or more computer programs, where the one or more computer programs are stored in the memory, the one or more computer programs include instructions, and when the instructions are executed by the device, the device performs following steps:

detecting a moving operation of a floating window moving toward a dynamic element, and determining adjustment information of the dynamic element; and adjusting a location and/or size of the dynamic element based on the adjustment information, so that the dynamic element avoids the floating window.

In an optional implementation, the adjustment information includes adjustment location information; and when the instructions are executed by the device, the device specifically performs following steps:

acquiring first location information of the floating window and second location information of the dynamic element; and generating the adjustment location information by using a first specified function and based on a specified first boundary value, a specified second boundary value, a specified first parameter, a specified second parameter, the first location information, and the second location information.

In an optional implementation, the adjustment information includes adjustment size information; and when the instructions are executed by the device, the device specifically performs following steps:

acquiring the first location information of the floating window, the second location information of the dynamic element, and current size information of the dynamic element; and generating the adjustment size information by using a second specified function and based on a specified boundary size, a specified third parameter, a specified fourth parameter, the first location information, the second location information, and the current size information.

In an optional implementation, the first boundary value is less than the second boundary value; and when the instructions are executed by the device, the device specifically performs following steps:

determining whether the adjustment location information is greater than or equal to the first boundary value and less than or equal to the second boundary value; and if it is determined that the adjustment location information is greater than or equal to the first boundary value and less than or equal to the second boundary value, continuing to perform the step of adjusting a location and/or size of the dynamic element based on the adjustment information.

In an optional implementation, when the instructions are executed by the device, the device specifically performs following step:

if it is determined that the adjustment location information is less than the first boundary value, determining the first boundary value as the adjustment location information, and continuing to perform the step of adjusting a location and/or size of the dynamic element based on the adjustment information.

In an optional implementation, when the instructions are executed by the device, the device specifically performs following step:

if it is determined that the adjustment location information is greater than the second boundary value, determining the second boundary value as the adjustment location information, and continuing to perform the step of adjusting a location and/or size of the dynamic element based on the adjustment information.

In an optional implementation, when the instructions are executed by the device, the device specifically performs following steps:

determining whether the adjustment size information is greater than or equal to the boundary size; and if it is determined that the adjustment size information is greater than or equal to the boundary size, continuing to perform the step of adjusting a location and/or size of the dynamic element based on the adjustment information.

In an optional implementation, when the instructions are executed by the device, the device specifically performs following step:

if it is determined that the adjustment size information is less than the boundary size, determining the boundary size as the adjustment size information, and continuing to perform the step of adjusting a location and/or size of the dynamic element based on the adjustment information.

In an optional implementation, when the instructions are executed by the device, the device specifically performs following step:

adjusting a location and/or size of a neighboring dynamic element of the dynamic element based on a specified proportion of the adjustment information.

According to a third aspect, an embodiment of this application provides a computer readable storage medium, where the computer readable storage medium is used for program code executed by a device, and the program code includes instructions used to execute the method in the first aspect or any one of the possible implementations of the first aspect.

In the technical solution provided in embodiments of this application, a moving operation of a floating window moving toward a dynamic element is detected, and adjustment information of the dynamic element is determined. A location and/or size of the dynamic element is adjusted based on the adjustment information, so that the dynamic element avoids the floating window, which can increase a visible area of the dynamic element, and improve operability of the dynamic element.

BRIEF DESCRIPTION OF DRAWINGS

To describe technical solutions in embodiments of this application more clearly, the following briefly describes the accompanying drawings required for describing the embodiments. Clearly, the accompanying drawings in the following description show merely some embodiments of this application, and a person of ordinary skill in the art may still derive other drawings from these accompanying drawings without creative efforts.

DESCRIPTION OF EMBODIMENTS

Figure 1:
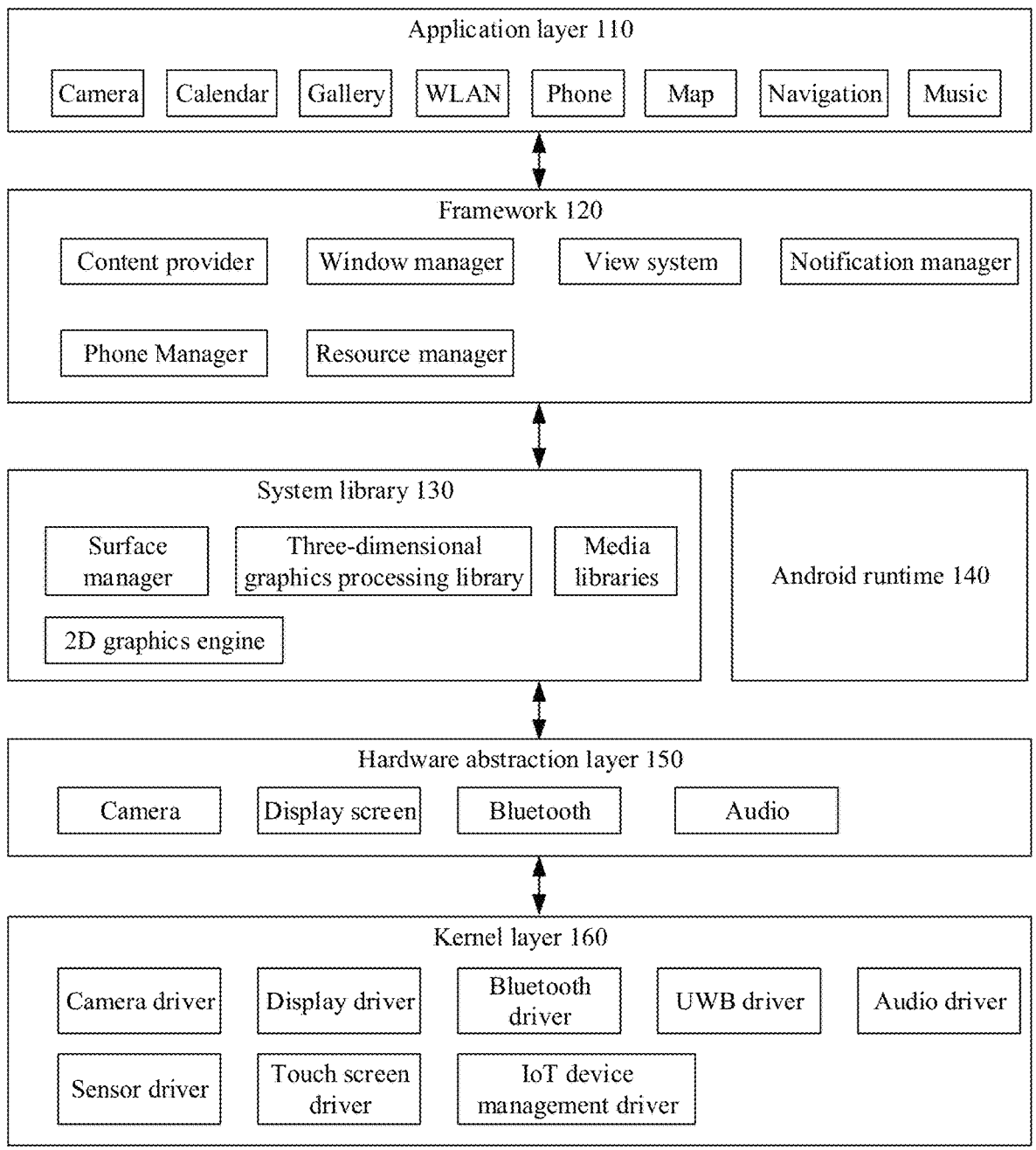
FIG. 1 is a block diagram of a software structure of an electronic device according to an embodiment of this application.

To better understand technical solutions of this application, the following describes embodiments of this application in detail with reference to the accompanying drawings.

It should be noted that the described embodiments are merely some, but not all, embodiments of this application. Based on the embodiments of this application, all other embodiments obtained by a person of ordinary skill in the art without creative efforts fall within the protection scope of this application.

The term used in the embodiments of this application is merely for the purpose of describing a specific embodiment, and is not intended to limit this application. The singular forms "one", "the" and "this" used in the embodiments of this application and the appended claims are also intended to include plural forms unless the context clearly represents other meanings.

It should be understood that the term "and/or" used in this specification is merely an association relationship that describes an associated object, and indicates that there may be three relationships. For example, A and/or B may indicate that A exists separately, A and B exist simultaneously, and B exists separately. In addition, in this application, the character "/" is "or". Generally, "/" indicates that associated objects are in an "or" relationship.

A floating window is a movable window suspended on a current interface of an electronic device, and the window may be a window of an application program. For example, a user is browsing a web page by using a browser, and a video that is being played may be suspended in a form of a floating window on a web page interface that is being browsed.

A current floating window includes a continuous floating window or a transient floating window. A continuous floating window refers to a floating window in which a user can continue to operate at a location on the current interface other than a blocked location of the floating window if the floating window is displayed on the current interface. A transient floating window is a floating window in which a user cannot operate on the current interface if the floating window is displayed on the current interface. For a transient floating window, a user needs to close the floating window before performing an operation on the current interface. For a continuous floating window, if a user wants to view or operate the content that is blocked by the floating window, the user needs to manually move the floating window to another location to expose the part of the blocked location to view or operate the content that is blocked by the floating window. If a button is blocked by the continuous floating window, and a user needs to click the button, the continuous floating window needs to be moved from an original location to another location where clicking the button is not affected. After the user clicks the button, the continuous floating window is moved to the original location. As a result of a cumbersome operation, user experience is poor, user usage costs are increased, and operation convenience is poor.

To resolve the problem, this application provides a dynamic element control method, which resolves a problem in a related technology that user experience is relatively poor because of a cumbersome operation, and resolves a problem that user usage costs are relatively high and operation convenience is relatively poor, thereby reducing user usage costs and improving operation convenience. It should be noted that the floating window involved in the dynamic element control method provided in this embodiment of this application is a continuous floating window.

An example of an electronic device includes but is not limited to a device loaded with iOS, Android, Microsoft, or another operating system. Optionally, the electronic device includes a mobile phone, a tablet computer, a wearable device, a sound box, or a personal computer. An example of a target device includes but is not limited to a device loaded with iOS, an Android, Microsoft, or another operating system. Optionally, the target device includes a mobile phone, a tablet computer, a wearable device, a sound box, or a personal computer.

Using an example in which an electronic device is a device with an Android system, FIG. 1 is a block diagram of a software structure of an electronic device according to an embodiment of this application. As shown in FIG. 1, a hierarchical architecture divides software into several layers, and each layer has a clear role and division of labor. A layer communicates with another layer through a software interface. In some embodiments, an Android system is divided into five layers from top to bottom: an application layer 110, a framework (Framework, FWK for short) layer 120, a system library 130, an Android runtime (Android runtime) 140, an hardware abstraction layer (Hardware Abstraction Layer, HAL for short) 150, and a kernel (kernel) layer 160.

The application layer 110 may include a series of application packages. As shown in FIG. 1, an application package may include an application program such as Camera, Gallery, Calendar, Phone, Map, Navigation, Wireless Local Area Network (Wireless Local Area Network, WLAN for short), and Music.

The framework layer 120 provides an application programming interface (application programming interface, API) and a programming framework for an application program of the application layer 110. The framework layer 120 includes some predefined functions. As shown in FIG. 1, the framework layer 120 may include a window manager, a content provider, a view system, a phone manager, a resource manager, a notification manager, and the like. The window manager is configured to manage a window program. The window manager may acquire a size of a display screen, and determine whether there is a status bar, a lock screen, a screen capture, or the like. The content provider is configured to store and obtain data and make the data accessible to the application program. The data may include videos, images, audio, calls made and answered, browsing history and bookmarks, address books, and the like. The view system includes visual controls, such as a control for displaying text and a control for displaying a picture. The view system may be configured to build an application program. A display interface may be composed of one or more views. For example, the display interface including an SMS notification icon may include a view for displaying text and a view for displaying a picture. The phone manager is configured to provide a communications function of the electronic device, for example, phone status management. The phone status management includes connecting, hanging up, or the like. The resource manager provides various resources for the application program, such as a localized character string, an icon, a picture, a layout file, a video file, and the like. The notification manager enables the application program to display notification information in a status bar, may be configured to convey a message of a notification type, and may automatically disappear after a short stay, without user interaction. For example, the notification manager is configured to notify download completion, message reminding, and the like. The notification manager may further give a notification that appears in a form of a chart or scroll bar text in a status bar at the top of the system, for example, a notification of an application program running in a background, or may further give a notification that appears in a form of a dialog box on a screen. For example, text information is prompted in the status bar, a prompt tone is given, the electronic device vibrates, and an indicator light flashes.

The system library 130 may include a plurality of function modules. For example, a surface manager (surface manager), a media library (Media Libraries), a three-dimensional graphics processing library, a 2D graphics engine, and the like. The surface manager is configured to manage a display subsystem, and provide fusion of 2D and 3D layers for a plurality of application programs. The media library supports various commonly used audio, video format playback and recording, static image files, and the like. The media library may support a plurality of audio and video coding formats, such as: Moving Picture Experts Group (MPEG4), a high compression digital video codec standard (H.264), a moving picture expert compression standard audio layer 3 (MP3), advanced audio coding (AAC), an adaptive multirate codec (AMR), Joint Photographic Group (JPG), Portable Network Graphics (PNG), and the like. The three-dimensional graphics processing library is configured to implement three-dimensional graphics drawing, image rendering, composition, layer processing, and the like, for example, OpenGLES. The 2D graphics engine is a drawing engine for 2D drawing, such as SGL.

The Android runtime 140 includes a core library and a virtual machine. The Android runtime 140 is responsible for scheduling and management of an Android system. The core library includes two parts: One is a function that the java language needs to invoke, and another is a core library of Android. The application layer 110 and the framework layer 120 operate in a virtual machine. The virtual machine executes a java file of the application layer and the framework layer 120 as a binary file. The virtual machine is configured to perform functions such as object lifecycle management, stack management, thread management, security and exception management, and garbage collection.

The hardware abstraction layer 150 is an abstract interface driven by the kernel layer 160 of the electronic device. The hardware abstraction layer 150 includes a plurality of library modules, and each library module implements an interface for a particular type of hardware component. The hardware abstraction layer 150 may provide an application programming interface for a higher-level Java API framework to access an underlying device. When an API framework requires access to hardware of the electronic device, the Android system loads a library module for the hardware component.

The kernel layer 160 is a layer between hardware and software. The kernel layer 160 includes at least a display driver, a camera driver, an audio driver, a sensor driver, a Bluetooth driver, an Ultra Wide Band (Ultra Wide Band, UWB for short) driver, an audio driver, a touchscreen driver, and an IoT device management driver. The kernel layer 160 is a basis of the Android system. A final function of the Android system may be implemented by using the kernel layer 160.

The hardware abstraction layer 150 may communicate with the framework layer 120 by using a hardware abstraction layer interface definition language (HAL interface definition language, HIDL for short). The HIDL is an interface definition language that specifies an interface between the HAL and the FWK.

The following describes a dynamic element control method by using a specific embodiment with reference to a scenario in which a floating window blocks a dynamic element in a moving process.

In this embodiment of this application, the dynamic element is an element that supports a dynamic layout. A general layout means that a location of an element is determined by a coordinate or a percentage. A coordinate includes an absolute coordinate or a relative coordinate. The absolute coordinate refers to a coordinate relative to an entire interface. For example, an absolute coordinate of an element a is (20 dp, 30 dp). The relative coordinate refers to a coordinate relative to a location of another element. For example, a relative coordinate of an element b relative to the element a is (20 dp, 30 dp), that is, the element b is located on a right side of the element a and is 20 dp away from the element a, and an upper side of the element a is 30 dp away from the element a. A percentage includes an absolute percentage or a relative percentage. The absolute percentage is a percentage relative to an entire interface. For example, the element a is located at 20% of the interface width and 30% of the interface height. The relative percentage refers to a percentage relative to a location of another element. For example, the element b is located on the right side of the element a and is 20% of the interface width away from the element a, and the upper side of the element a is 30% of the interface height away from the element a.

Compared with the general layout, the dynamic layout in this embodiment of this application refers to a layout in which a location of an element is affected by a specified rule and changes within a specified range at a specified time interval. The specified rule may be a rule that meets a specified function, for example, a linear function, a sine curve, a Bessel curve, a power function curve, or an exponential function. The time interval may be set according to an actual situation, and a relatively small time interval may be set, so as to implement real-time change of a location of a real-time element. The specified range includes a variable range of a location of an element.

In this embodiment of this application, the dynamic element includes an application icon or a tool component, for example, Clock, Weather, Calendar, or Search box. Optionally, the dynamic element may further include function navigation inside the application program, where the function navigation includes a functional button, a thumbnail, an advertisement banner, bottom navigation, and a menu item, for example, bottom navigation inside a WeChat application program, and the bottom navigation includes "Chats", "Contacts", "Discover", and "Me".

Figure 2:
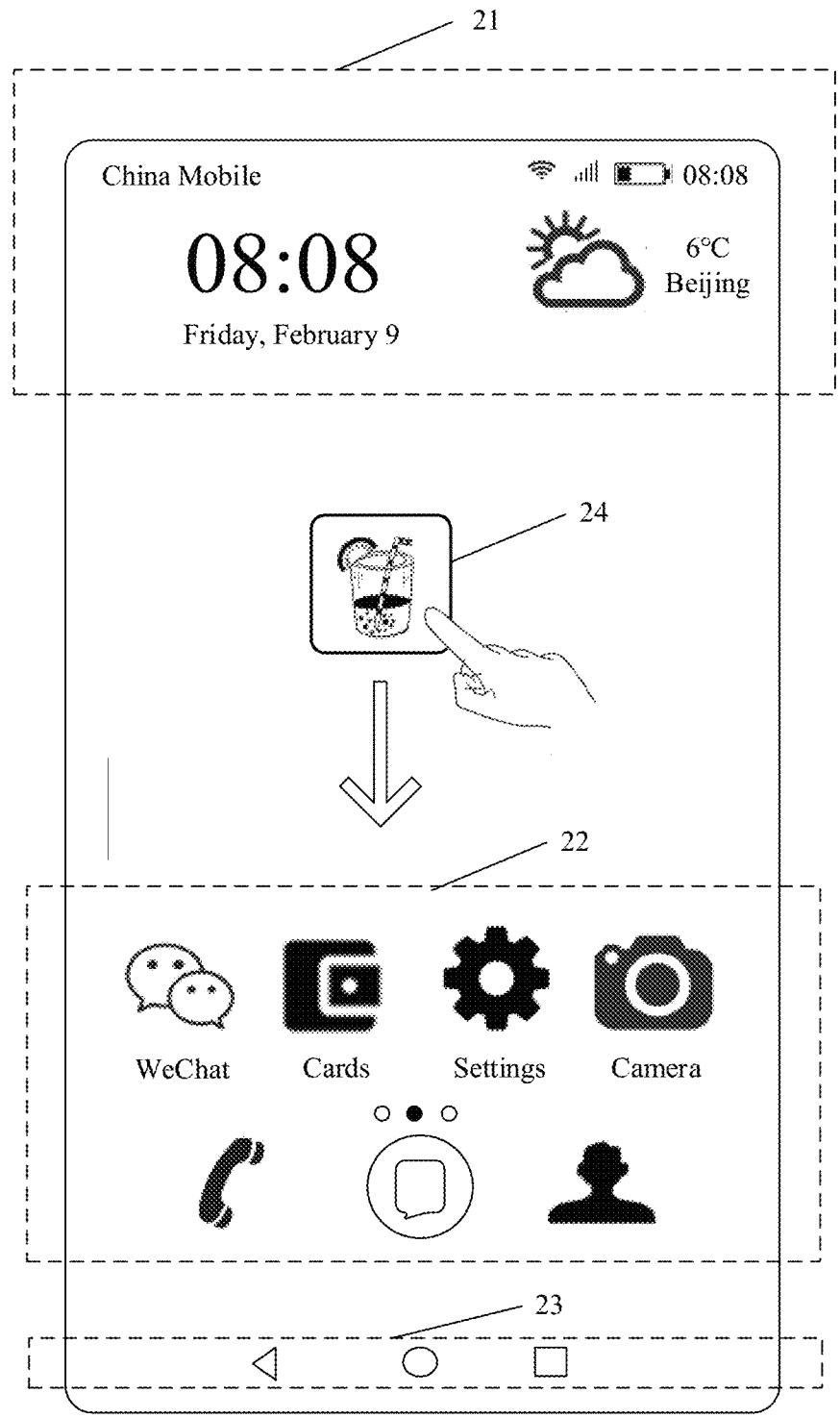
FIG. 2 is a schematic diagram of an interface of an electronic device of a user according to an embodiment of this application.

Taking the dynamic element as an application icon as an example, it is assumed that a user moves a floating window downward from the middle of a screen according to a personal requirement, so that the floating window does not affect display of a current interface. FIG. 2 is a schematic diagram of an interface of an electronic device of a user according to an embodiment of this application. As shown in FIG. 2, the interface includes a status bar 21, a menu bar 22, and a function bar 23. The status bar 21 includes an operator, a current time, a current geographical location and local weather, a network status, a signal status, and power supply electricity quantity. As shown in FIG. 2, the operator is China Mobile. The current time is Friday, February 9, 08:08. The current geographical location is Beijing. The weather in Beijing is cloudy and the temperature is 6 degrees Celsius. The network status is wife network. The signal status is full signal, indicating that a current signal is strong. A black part of the power supply electricity quantity may represent remaining power of the electronic device. The menu bar 22 includes at least one application icon, and under each application icon, there is a name of a corresponding application program, for example, WeChat, Cards, Settings, Camera, Phone, SMS message, and Contacts. A location of the application icon and the name of the corresponding application program may be adjusted according to a preference of a user, which is not limited in this embodiment of this application. The function bar 23 includes a back key, a home key, and a menu key. The back key is used to return to a previous level, the home key is used to return to a home screen, and the menu key is used to display a plurality of background applications.

As shown in FIG. 2, the interface further includes a floating window 24. The floating window 24 may be an interface of an application, for example, the floating window 24 is a video interface being played. The floating window 24 is located in the middle of the interface of the electronic device. If a user wants to move the floating window 24 to prevent the floating window 24 from affecting display of the current interface, the user may drag the floating window 24 to move downward, and in a process of moving downward, adjustment information of an application icon is generated, where the adjustment information includes adjustment location information and/or adjustment size information. If the adjustment information includes the adjustment location information, in a process in which the floating window 24 moves downward, the application icon also moves downward with the floating window to a specified location. Optionally, if the adjustment information includes the adjustment size information, in a process in which the floating window 24 moves downward, the application icon may be reduced to a specified size.

It should be noted that a schematic diagram of an interface of the electronic device shown in FIG. 2 is exemplary display of this embodiment of this application, and a schematic diagram of the interface of the electronic device may also be another style, which is not limited in this embodiment of this application.

Figure 3:
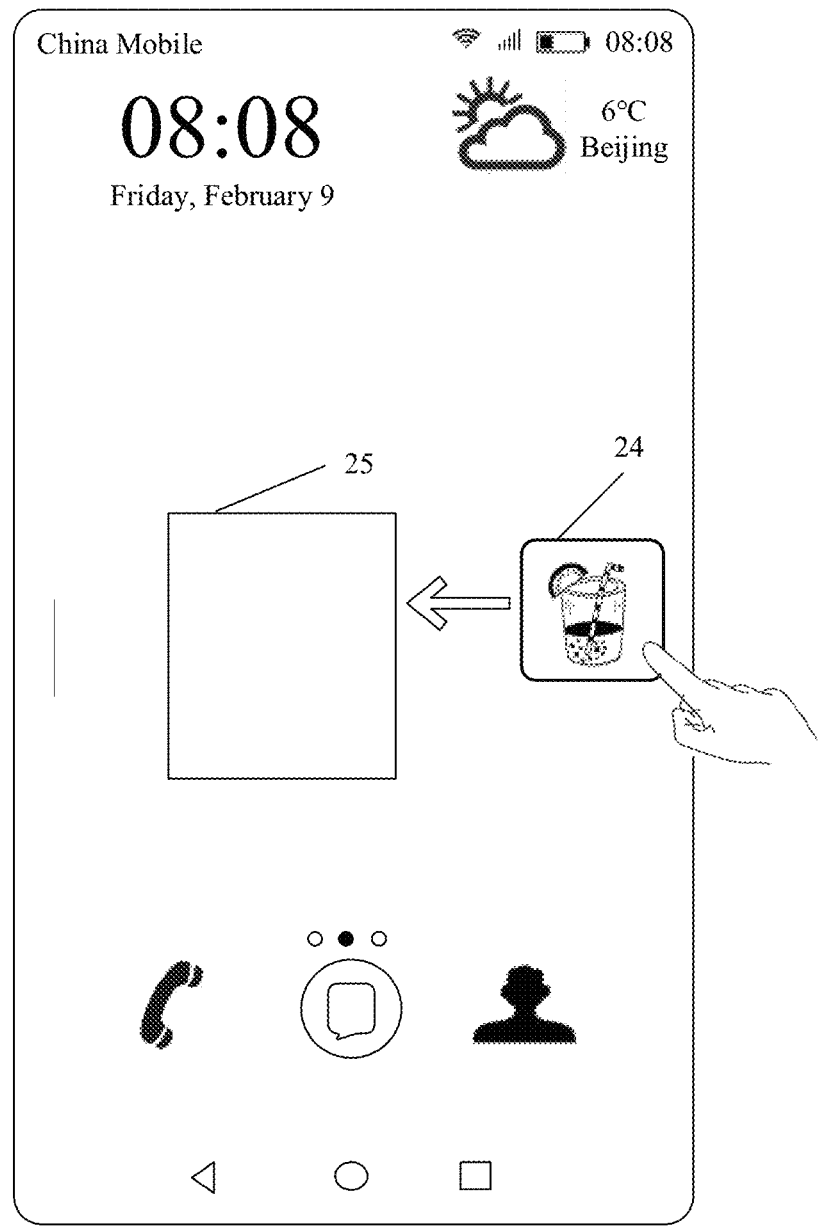
FIG. 3 is a schematic diagram of an interface for adjusting a location of a dynamic element according to an embodiment of this application.

For example, the dynamic element is an application icon 25, and a user drags the floating window 24 to move horizontally. A process of adjusting a location of the dynamic element is described. Because the user drags the floating window 24 horizontally, in a process of adjusting the application icon 25, only a horizontal coordinate of adjusting the application icon 25 needs to be calculated, and a vertical coordinate of the application icon 25 does not need to be calculated. The electronic device acquires first location information of the floating window 24 and second location information of the application icon 25, where the first location information includes a horizontal coordinate $x_f$ of a center point of the floating window 24, and the second location information includes an original horizontal coordinates $x_{m0}$ of the application icon 25. An adjustment horizontal coordinate of the application icon 25 is $x_m$. A first parameter a and a second parameter b are set according to different scenarios of an actual interface. For example, the first parameter a and the second parameter b may be determined according to a width of the floating window 24. For example, in a scenario of an actual interface, a dynamic element needs to move in a small range, and thus both the first parameter a and the second parameter b are set to a relatively small value. For example, in a scenario of an actual interface, if a floating window needs to avoid blocking a dynamic element, both the first parameter a and the second parameter b are set to a relatively large value. The first parameter a and the second parameter b are used to control sensitivity of moving the application icon 25, and it is specified that the first parameter is greater than the second parameter and the second parameter is greater than 0, that is, a>b>0. A first boundary value $x_{m1}$ and a second boundary value $x_{m2}$ are set for the adjustment horizontal coordinate $x_m$. The first boundary value $x_{m1}$ is less than the second boundary value $x_{m2}$. A value of the adjustment horizontal coordinate should be greater than or equal to the first boundary value $x_{m1}$ and less than or equal to the second boundary value $x_{m2}$. In this embodiment of this application, the first boundary value $x_{m1}$ and the second boundary value $x_{m2}$ may be set according to a spacing among a plurality of application icons 25. The spacing among the plurality of application icons 25 and ranges of the first boundary value $x_{m1}$ and the second boundary value $x_{m2}$ are in a positive proportional function relationship, that is, a larger spacing among the plurality of application icons 25 leads to larger ranges of the first boundary value $x_{m1}$ and the second boundary value $x_{m2}$. The adjustment location information is generated by using a first specified function and based on a first boundary value, a second boundary value, a first parameter, a second parameter, the first location information, and the second location information. The first specified function includes a linear function, a sine curve, a Bessel curve, a power function curve, or an exponential function. Taking the first specified function as a linear function as an example, FIG. 3 is a schematic diagram of an interface for adjusting a location of a dynamic element according to an embodiment of this application. As shown in FIG. 3, taking the dynamic element as the application icon 25 as an example, the floating window 24 is located on the right side of the interface, the application icon 25 is located in the middle of the interface, and a user drags the floating window 24 to the left to move the floating window 25 from the right to the left. It is assumed that in this case, a difference obtained after the horizontal coordinate of the center point of the floating window 24 minus the original horizontal coordinate of the application icon 25 is greater than or equal to the first parameter, that is, $x_f - x_{m0} \geq a$, which indicates that a distance between the floating window 24 and the application icon 25 is long enough. In this case, the floating window 24 does not affect an operation performed by the user on the application icon 25. Therefore, a location of the application icon 25 remains an original coordinate, and does not need to be adjusted, that is, $x_m = x_{m0}$.

Figure 4:
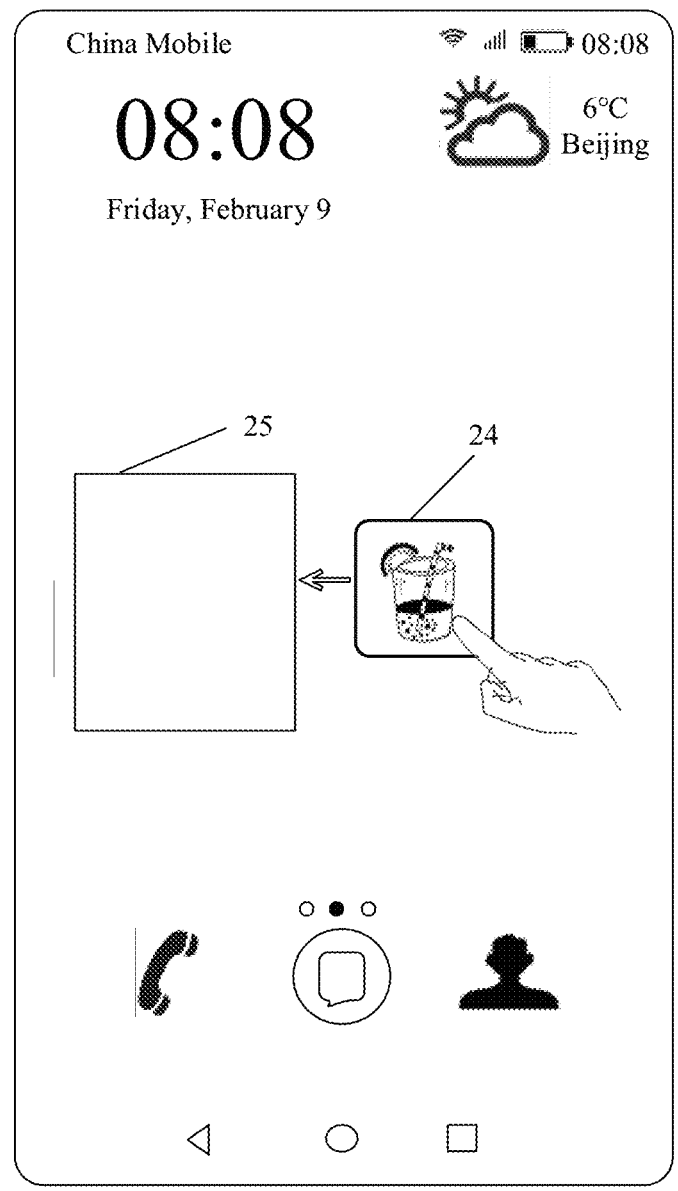
FIG. 4 is a schematic diagram of still another interface for adjusting a location of a dynamic element according to an embodiment of this application.

In this case, the user continues to drag the floating window 24 to the left to make the floating window 24 continue to move from the right to the left. FIG. 4 is a schematic diagram of another interface for adjusting a location of a dynamic element according to an embodiment of this application. As shown in FIG. 4, it is assumed that in this case, a difference obtained after the horizontal coordinate of the center point of the floating window 24 minus the original horizontal coordinate of the application icon 25 is less than the first parameter and greater than the second parameter, that is, $a > x_f - x_{m0} > b$. By using a formula $x_m = (x_f - x_{m0})*(x_{m0} - x_{m1})/(a-b) + (ax_{m1} - bx_{m0})/(a-b)$, the horizontal coordinate $x_f$ of the center point of the floating window 24, the original horizontal coordinate $x_{m0}$ of the application icon 25, the first boundary value $x_{m1}$, the second boundary value $x_{m2}$, the first parameter a and the second parameter b are calculated, to generate the adjustment horizontal coordinate $x_m$ of the application icon 25, and the adjustment horizontal coordinate $x_m$ is the adjustment location information. The location of the application icon 25 is adjusted based on the adjustment horizontal coordinate $x_m$, so that the vertical coordinate of the application icon 25 remains unchanged, and the original horizontal coordinate is changed to the adjustment horizontal coordinate.

Figure 5:
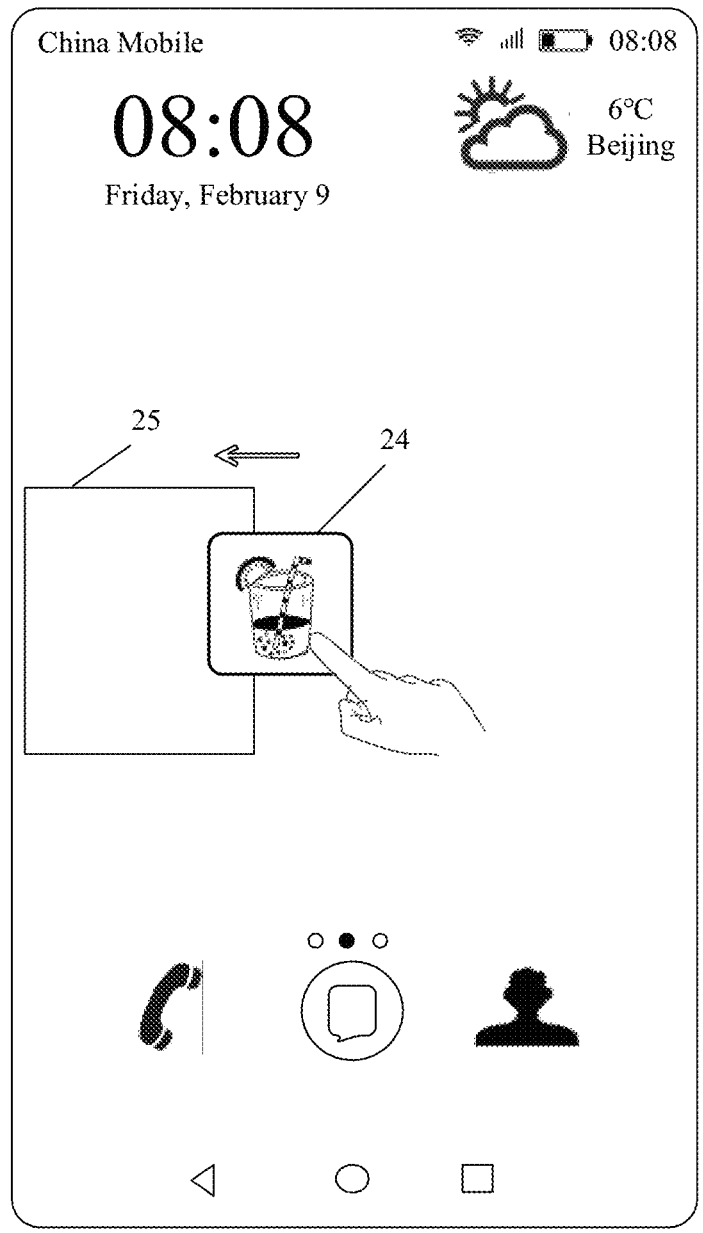
FIG. 5 is a schematic diagram of still another interface for adjusting a location of a dynamic element according to an embodiment of this application.

In this case, the user continues to drag the floating window 24 to the left to make the floating window 24 continue to move from the right to the left. FIG. 5 is a schematic diagram of still another interface for adjusting a location of a dynamic element according to an embodiment of this application. As shown in FIG. 5, it is assumed that in this case, a difference obtained after the horizontal coordinate of the center point of the floating window 24 minus the original horizontal coordinate of the application icon 25 is less than or equal to the second parameter and greater than or equal to an opposite number of the second parameter, that is, $b \geq x_f - x_{m0} \geq -b$. By using a formula $x_m = (x_f - x_{m0})*(x_{m1} - x_{m2})/2 + (x_{m1} + x_{m2})/2$, the horizontal coordinate $x_f$ of the center point of the floating window 24, the original horizontal coordinate $x_{m0}$ of the application icon 25, the first boundary value $x_{m1}$, the second boundary value $x_{m2}$, and the second parameter b are calculated, to generate the adjustment horizontal coordinate $x_m$ of the application icon 25, and the adjustment horizontal coordinate $x_m$ is the adjustment location information. The location of the application icon 25 is adjusted based on the adjustment horizontal coordinate $x_m$, so that the vertical coordinate of the application icon 25 remains unchanged, and the original horizontal coordinate is changed to the adjustment horizontal coordinate.

Figure 6:
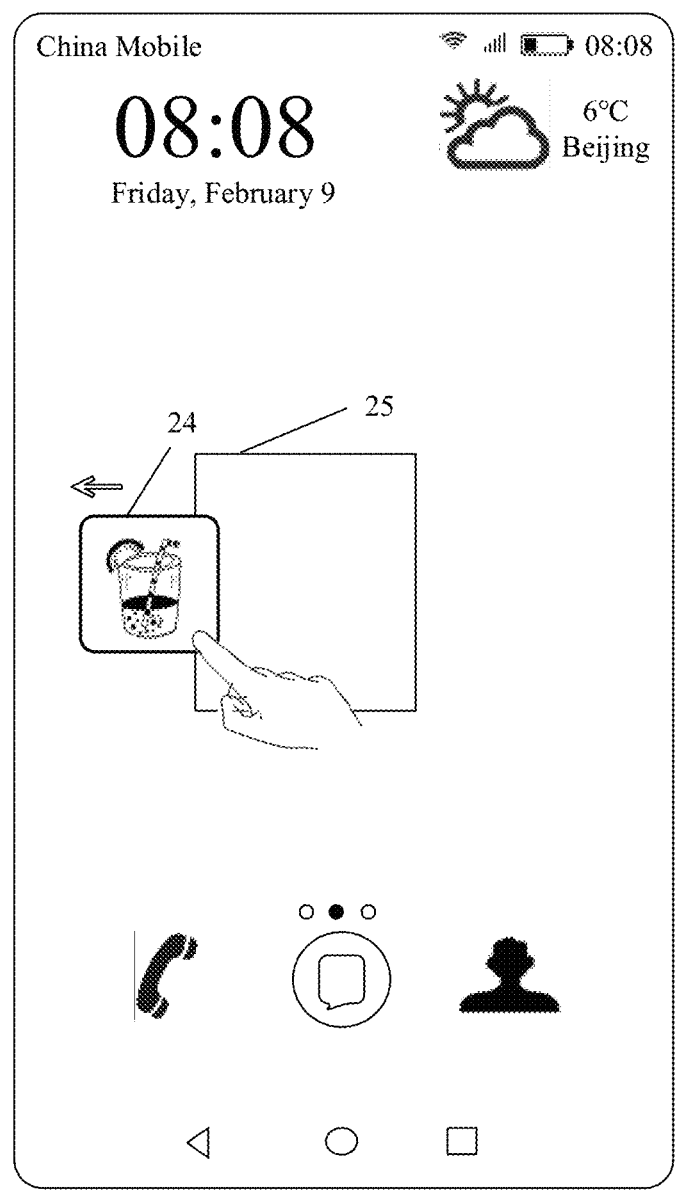
FIG. 6 is a schematic diagram of still another interface for adjusting a location of a dynamic element according to an embodiment of this application.

In this case, the user continues to drag the floating window 24 to the left to make the floating window 24 continue to move from the right to the left. FIG. 6 is a schematic diagram of still another interface for adjusting a location of a dynamic element according to an embodiment of this application. As shown in FIG. 6, it is assumed that in this case, a difference obtained after the horizontal coordinate of the center point of the floating window 24 minus the original horizontal coordinate of the application icon 25 is less than an opposite number of the second parameter and greater than an opposite number of the first parameter, that is, $-b > x_f - x_{m0} > -a$. By using a formula $x_m = (x_f - x_{m0})*(x_{m2} - x_{m0})/(a-b) + (ax_{m2} - bx_{m0})/(a-b)$, the horizontal coordinate $x_f$ of the center point of the floating window 24, the original horizontal coordinate $x_{m0}$ of the application icon 25, the first boundary value $x_{m1}$, the second boundary value $x_{m2}$, the first parameter a and the second parameter b are calculated, to generate the adjustment horizontal coordinate $x_m$ of the application icon 25, and the adjustment horizontal coordinate $x_m$ is the adjustment location information. The location of the application icon 25 is adjusted based on the adjustment horizontal coordinate $x_m$, so that the vertical coordinate of the application icon remains unchanged, and the original horizontal coordinate is changed to the adjustment horizontal coordinate.

Figure 7:
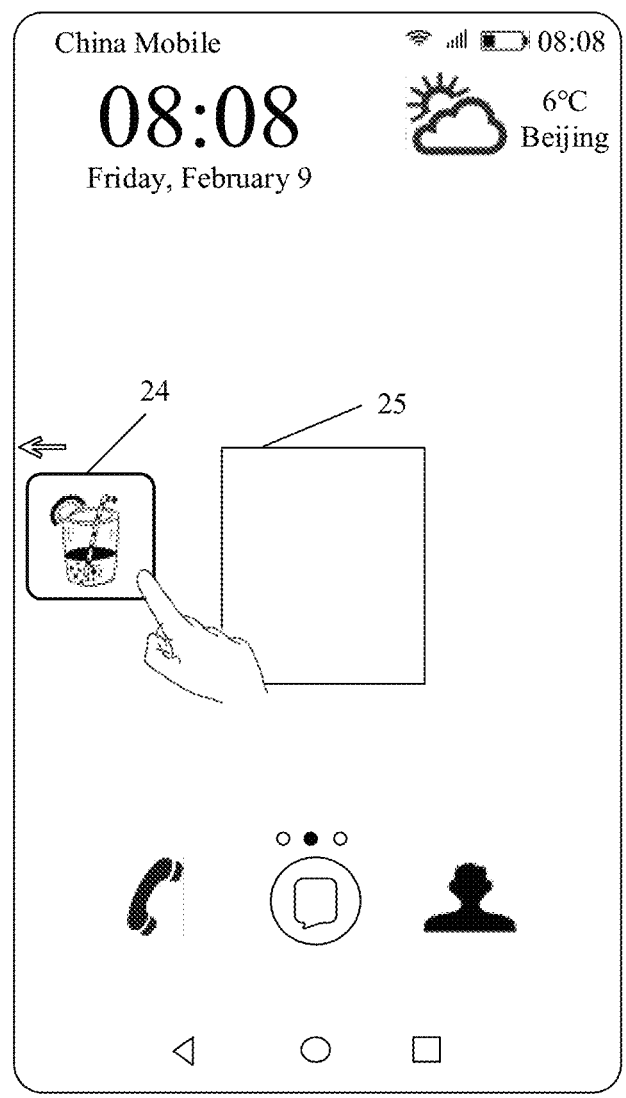
FIG. 7 is a schematic diagram of still another interface for adjusting a location of a dynamic element according to an embodiment of this application.

In this case, the user continues to drag the floating window 24 to the left to make the floating window 24 move from the right to the left. FIG. 7 is a schematic diagram of still another interface for adjusting a location of a dynamic element according to an embodiment of this application. As shown in FIG. 7, it is assumed that in this case, the difference obtained after the horizontal coordinate of the center point of the floating window 24 minus the original horizontal coordinate of the application icon 25 is less than or equal to an opposite number of the first parameter, that is, $x_f - x_{m0} \leq -a$, which indicates that a distance between the floating window 24 and the application icon 25 is long enough. In this case, the floating window 24 does not affect an operation performed by the user on the application icon 25. Therefore, the location of the application icon 25 remains the original coordinate, and does not need to be adjusted, that is, $x_m = x_{m0}$.

Figure 8:
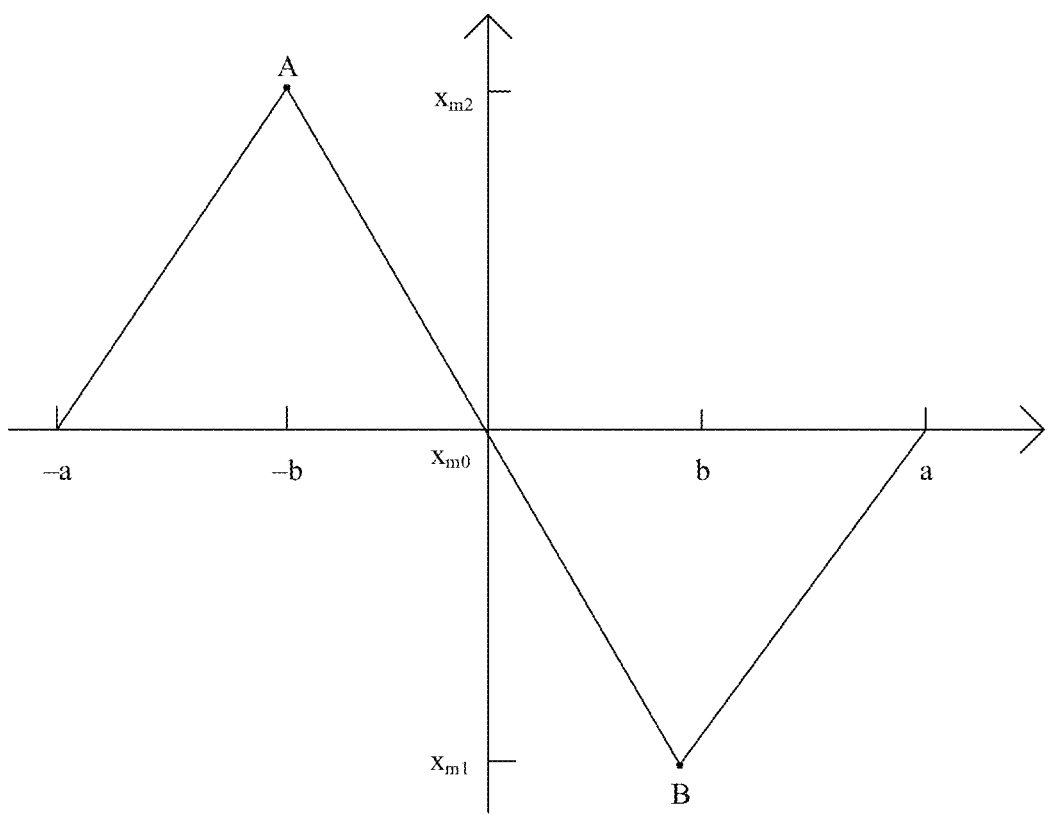
FIG. 8 is a schematic diagram of a linear function according to an embodiment of this application.

For example, the dynamic element includes the application icon 25. FIG. 8 is a schematic diagram of a linear function according to an embodiment of this application. As shown in FIG. 8, a horizontal axis of the schematic diagram of the function is a difference obtained after the horizontal coordinate of the center point of the floating window 24 minus the original horizontal coordinate of the application icon 25, and a vertical axis is the adjustment horizontal coordinate of the application icon 25. When the user drags the floating window 24 horizontally to make the floating window 24 move horizontally, if in this case, a difference obtained after the horizontal coordinate of the center point of the floating window 24 minus the original horizontal coordinate of the application icon 25 is greater than the first parameter or less than the opposite number of the first parameter, the location of the application icon 25 remains the original coordinate, and does not need to be adjusted. As the user continues to drag the floating window 24 horizontally to make the floating window 24 move horizontally, the application icon 25 moves in a direction away from the floating window 24 until a difference obtained after the horizontal coordinate of the center point of the floating window 24 minus the original horizontal coordinate of the application icon 25 is equal to the second parameter, and the location of the application icon 25 reaches a first boundary value; or until the difference obtained after the horizontal coordinate of the center point of the floating window 24 minus the original horizontal coordinate of the application icon 25 is equal to the opposite number of the second parameter, and the location of the application icon 25 reaches a second boundary value. As the user continues to drag the floating window 24 horizontally to make the floating window 24 move horizontally, as a blocking area gradually decreases, the application icon 25 is reset to the original location, thereby implementing an effect that the application icon 25 dynamically avoids the floating window 24.

Figure 9:
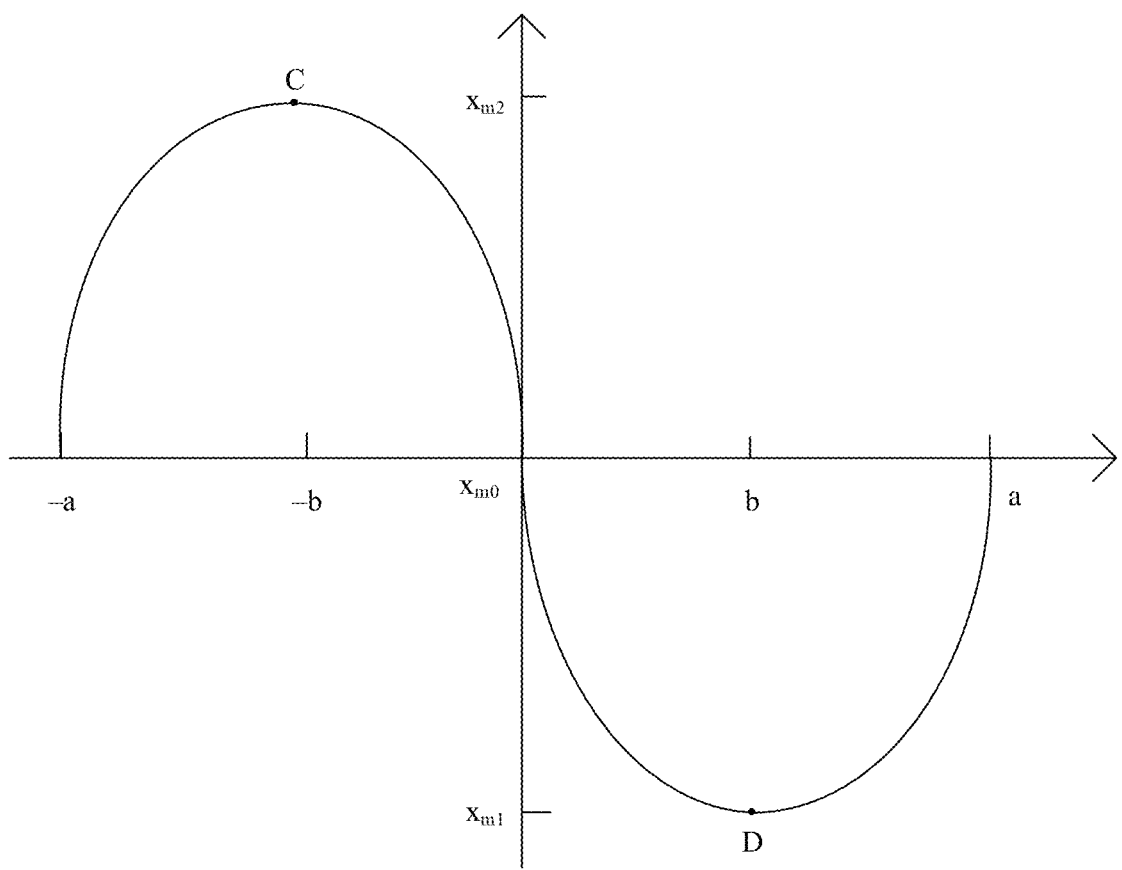
FIG. 9 is a schematic diagram of a sine curve function.
Figure 10:
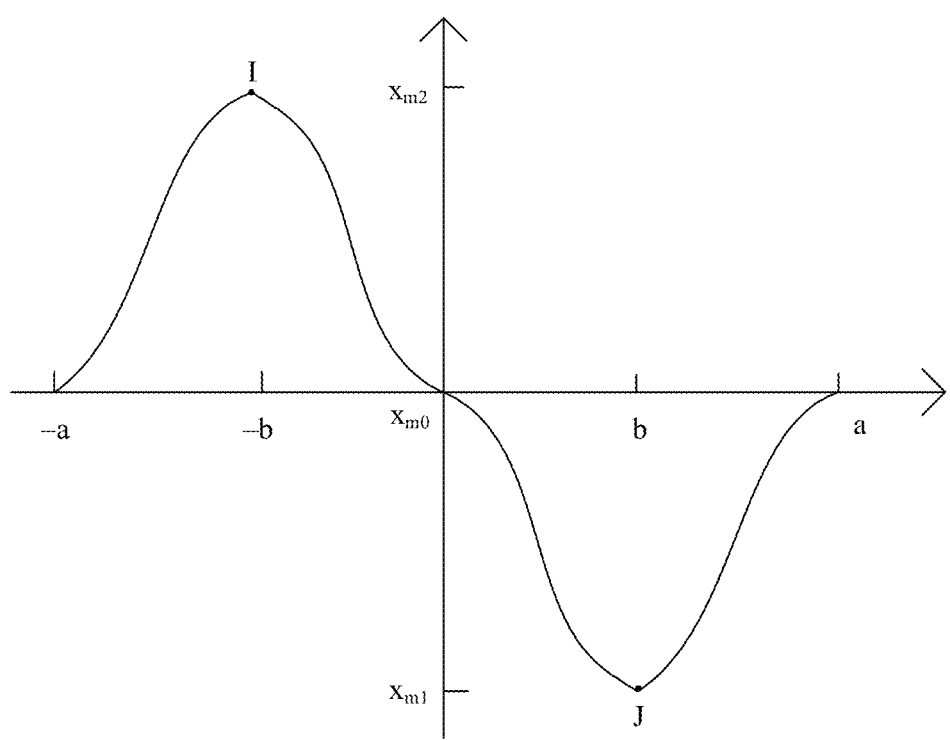
FIG. 10 is a schematic diagram of a Bessel curve function.

Further, transition between a key point A and a key point B in the schematic diagram of the linear function shown in FIG. 8 is relatively sudden. If the floating window 24 continues to move horizontally in this case, the dynamic element suddenly moves horizontally at a specified speed, without a gradual process of changing in the moving speed. To further optimize a control effect of the dynamic element, the sine curve, the Bessel curve, the power function curve, or the exponential function may be used instead of the linear function. For example, FIG. 9 is a schematic diagram of a sine curve function. As shown in FIG. 9, a horizontal axis and a vertical axis of the schematic diagram of the function have same meanings as those of the schematic diagram of the linear function shown in FIG. 8. Details are not described herein again. Transition between a key point C and a key point D is relatively slow compared with a schematic diagram of the linear function. For example, FIG. 10 is a schematic diagram of a Bessel curve function. As shown in FIG. 10, a horizontal axis and a vertical axis of the schematic diagram of the function have same meanings as those of the schematic diagram of the function shown in FIG. 8 or FIG. 9. Details are not described herein again. Transition between a key point I and a key point J is relatively slow compared with the schematic diagram of the linear function. As the user continues to drag the floating window to make the floating window 24 move horizontally, the dynamic element moves horizontally at a relatively slow speed, and there is a clear buffer process at the moving speed, which can improve user experience.

In this embodiment of this application, for example, FIG. 3 to FIG. 7 are schematic diagrams in which the user drags the floating window to move horizontally. If the user drags the floating window 24 to move vertically, only a vertical coordinate of the dynamic element needs to be calculated, and a horizontal coordinate of the dynamic element does not need to be calculated. A process of determining adjustment location information of the dynamic element is the same as that in FIG. 3 to FIG. 7. Details are not described herein again.

Figure 11A:
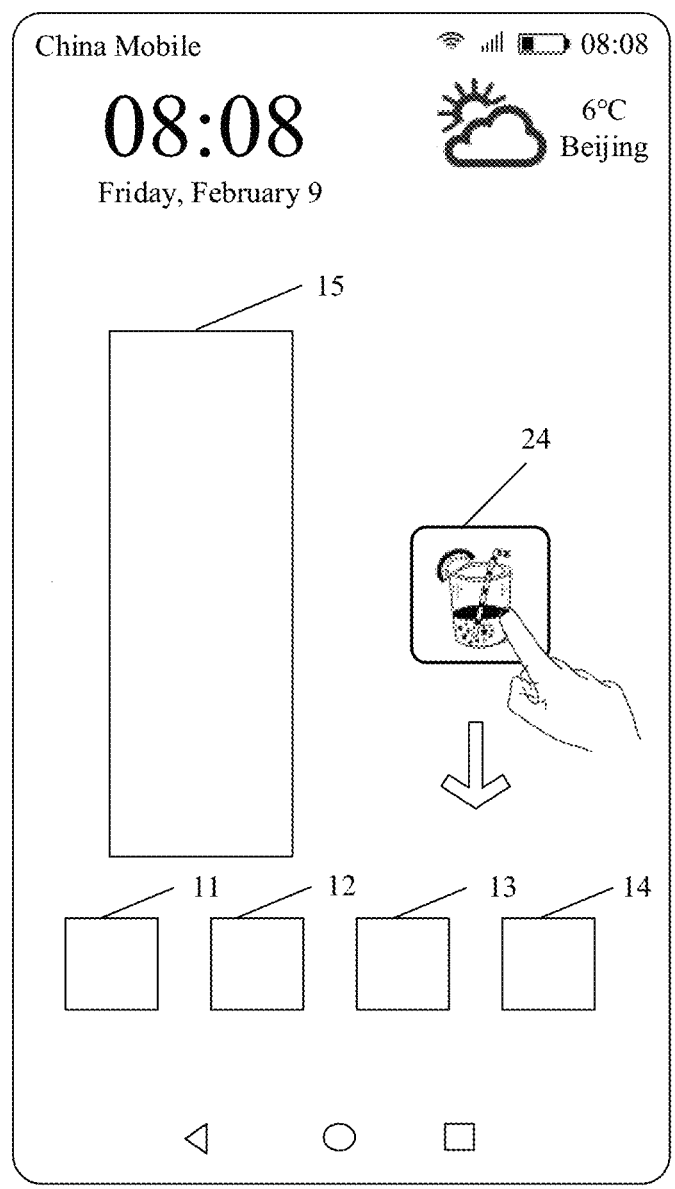
FIG. 11a to FIG. 11c are schematic diagrams of still another interface for adjusting a location of a dynamic element according to an embodiment of this application.
Figure 11B:
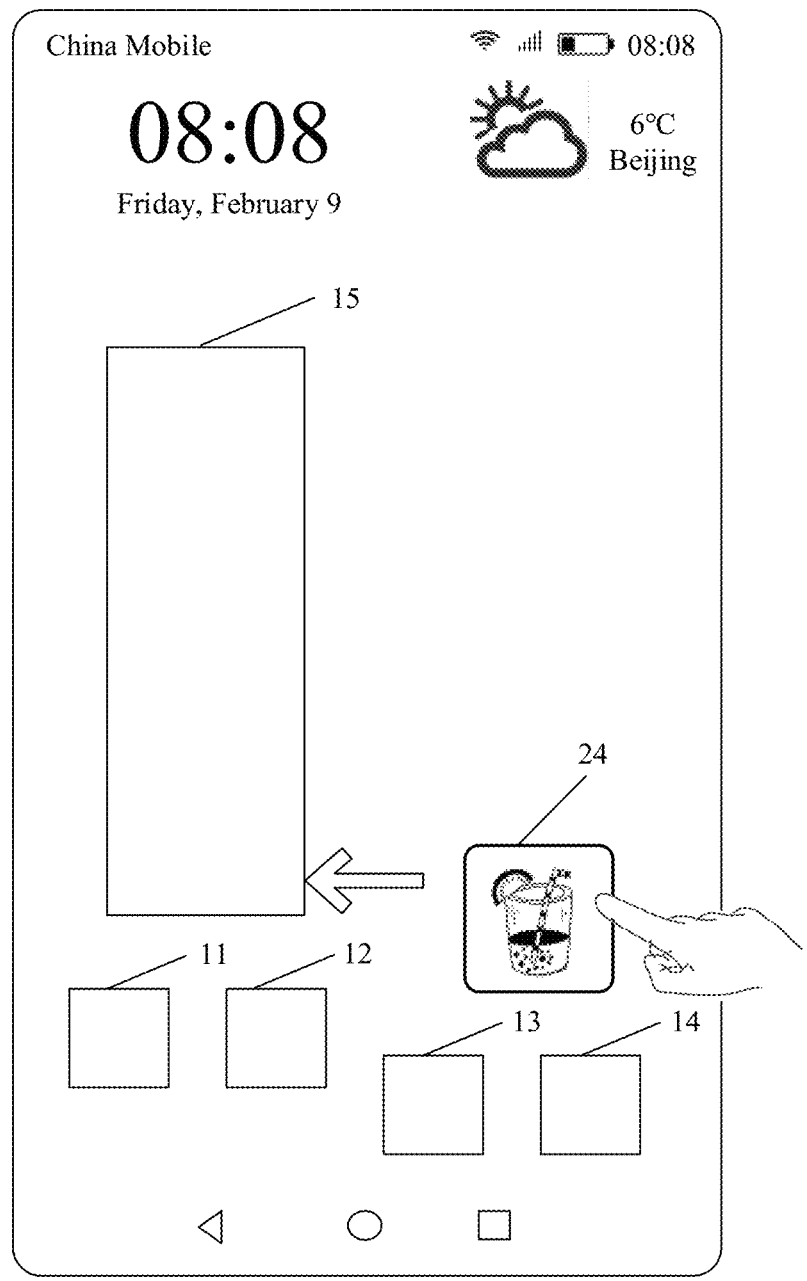
Figure 11C:
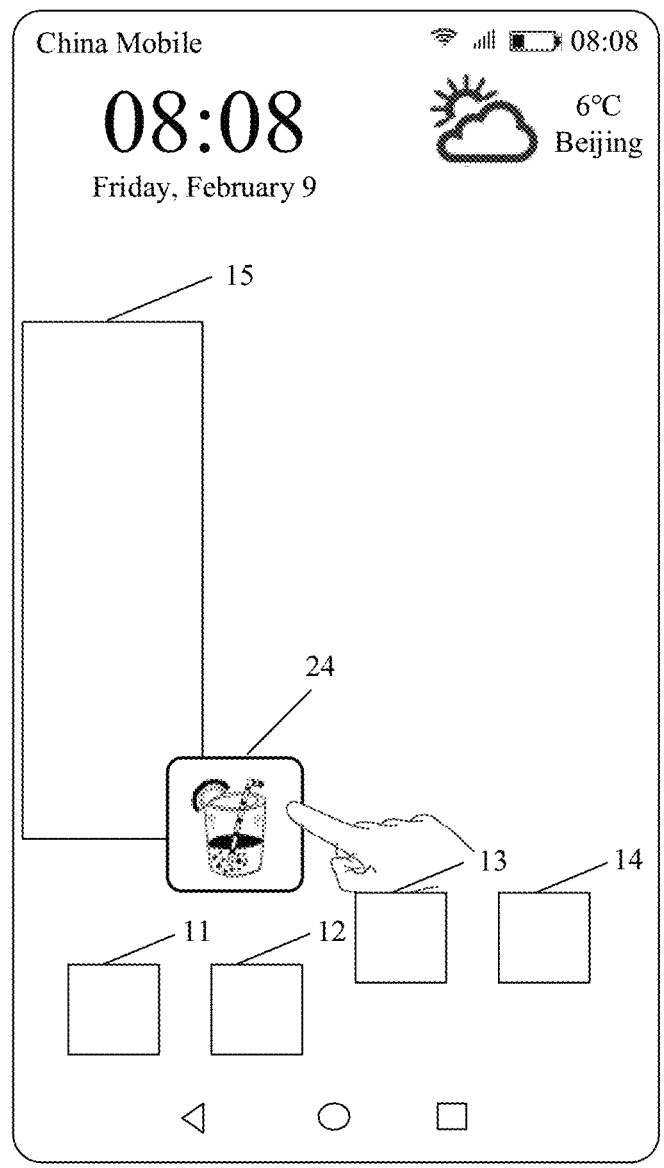

In this embodiment of this application, if the user drags the floating window 24 to move horizontally and vertically, both the vertical coordinate and the horizontal coordinate of the dynamic element need to be calculated, and an adjustment horizontal coordinate and an adjustment vertical coordinate of the dynamic element are separately determined by using a specified function. The adjustment horizontal coordinate and the adjustment vertical coordinate are used as the adjustment location information of the dynamic element, and the location of the dynamic element is adjusted based on the adjustment location information. FIG. 11a to FIG. 11c are schematic diagrams of still another interface for adjusting a location of a dynamic element according to an embodiment of this application. As shown in FIG. 11a, the interface includes a plurality of dynamic elements, which are respectively a first dynamic element 11, a second dynamic element 12, a third dynamic element 13, a fourth dynamic element 14, and a fifth dynamic element 15. The first dynamic element 11, the second dynamic element 12, the third dynamic element 13, and the fourth dynamic element 14 are located below the interface; and the fifth dynamic element 15 is located on a left side of the interface. The interface further includes a floating window 24, where the floating window 24 is located on a right side of the interface, and the floating window 14 is located above the third dynamic element 13 and the fourth dynamic element 14. A user drags the floating window 24 downward to move the floating window 24 downward. As shown in FIG. 11b, as the floating window 24 moves downward and gradually gets close to the third dynamic element 13 and the fourth dynamic element 14, the third dynamic element 13 and the fourth dynamic element 14 move in a direction away from the floating window 24. In this case, the user drags the floating window 24 to the left to make the floating window 24 continue to move to the left. As shown in FIG. 11c, as the floating window 24 moves to the left and gradually gets close to the first dynamic element 11, the second dynamic element 12, and the fifth dynamic element 15, all of the first dynamic element 11, the second dynamic element 12, and the fifth dynamic element 15 move in a direction away from the floating window 24. As the floating window 24 moves to the left and gradually gets away from the third dynamic element 13 and the fourth dynamic element 14, the third dynamic element 13 and the fourth dynamic element 14 gradually reset to their respectively original locations. In a process of moving the floating window 24, for a process of determining adjustment location information of the first dynamic element 11, the second dynamic element 12, the third dynamic element 13, the fourth dynamic element 14, and the fifth dynamic element 15, refer to processes shown in FIG. 3 to FIG. 7. Details are not described herein again.

In this embodiment of this application, after the adjustment location information is generated, the adjustment location information needs to be compared with the first boundary value and the second boundary value. Specifically, it is determined whether the adjustment location information is greater than or equal to the first boundary value and less than or equal to the second boundary value. If it is determined that the adjustment location information is greater than or equal to the first boundary value and less than or equal to the second boundary value, the location of the dynamic element is adjusted based on the adjustment location information. If it is determined that the adjustment location information is less than the first boundary value, the first boundary value is determined as the adjustment location information, and the location of the dynamic element is adjusted based on changed adjustment location information. If it is determined that the adjustment location information is greater than the second boundary value, the second boundary value is determined as the adjustment location information, and the location of the dynamic element is adjusted based on the changed adjustment location information.

Figure 12:
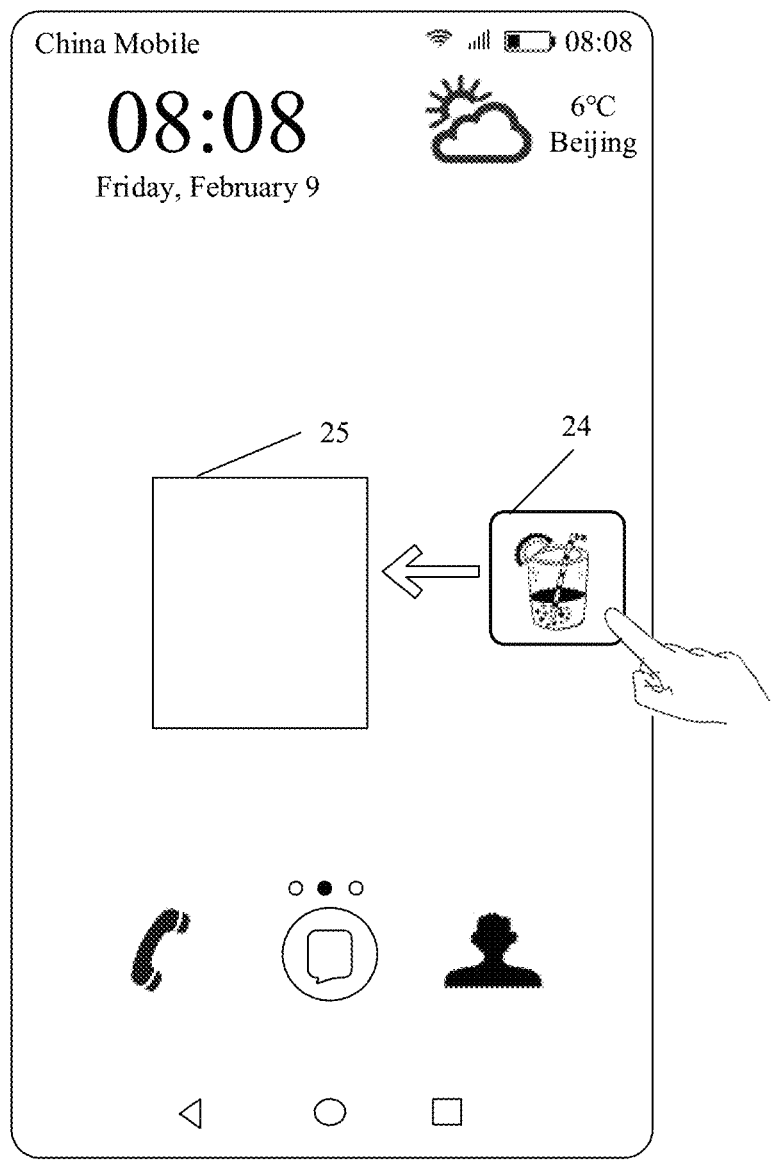
FIG. 12 is a schematic diagram of an interface for adjusting a size of a dynamic element according to an embodiment of this application.

In another optional solution, adjustment information of the dynamic element further includes adjustment size information. For example, the dynamic element is the application icon 25, and the user drags the floating window 24 to move horizontally. A process of adjusting a size of the dynamic element is described. Because the user drags the floating window 24 horizontally, in a process of adjusting the application icon 25, only a horizontal size of adjusting the application icon 25 needs to be calculated, and a vertical size of the application icon 25 does not need to be calculated. The electronic device acquires first location information of the floating window 24, second location information of the application icon 25, and current size information of the application icon 25, where the first location information includes the horizontal coordinate $x_f$ of the center point of the floating window 24, the second location information includes the original horizontal coordinate $x_{m0}$ of the application icon 25, and the current size information includes an original horizontal size so of the application icon 25. An adjustment horizontal size of the application icon 25 is s. A third parameter c and a fourth parameter d are set according to different scenarios of an actual interface. For example, the third parameter c and the fourth parameter d may be determined based on a width of the floating window 24. For example, in a scenario of an actual interface, the dynamic element moves in a small range, so that both the third parameter c and the fourth parameter d are set to a relatively small value. For example, in a scenario of an actual interface, if the floating window needs to avoid blocking the dynamic element, both the third parameter c and the fourth parameter d are set to a relatively large value. The third parameter c and the fourth parameter d are used to control sensitivity of scaling of the application icon 25, and it is specified that the third parameter is greater than the fourth parameter and the fourth parameter is greater than 0, that is, $c>d>0$. A boundary size $s_{min}$ is set for an adjustment horizontal size s, and a value of the adjustment horizontal size should be greater than or equal to the boundary size $s_{min}$. In this embodiment of this application, the boundary size $s_{min}$ may be set based on a spacing between a plurality of application icons 25. The adjustment size information is generated by using a second specified function and based on a boundary size, a third parameter, a fourth parameter, the first location information, and the current size information. The second specified function includes a linear function, a sine curve, a Bessel curve, a power function curve, or an exponential function. Taking the second specified function as a linear function as an example, FIG. 12 is a schematic diagram of an interface for adjusting a size of a dynamic element according to an embodiment of this application. As shown in FIG. 12, taking the dynamic element as the application icon 25 as an example, the floating window 24 is located on the right side of the interface, the application icon 25 is located in the middle of the interface, and the user drags the floating window 24 to the left to move the floating window 24 from the right to the left. It is assumed that in this case, a difference obtained after the horizontal coordinate of the center point of the floating window 24 minus the original horizontal coordinate of the application icon 25 is greater than or equal to the third parameter, that is, $x_f-x_{m0} \geq c$, which indicates that a distance between the floating window 24 and the application icon 25 is long enough. In this case, the floating window 24 does not affect an operation performed by the user on the application icon 25. Therefore, a horizontal size of the application icon 25 remains an original horizontal size, and does not need to be adjusted, that is, $s=s_0$.

Figure 13:
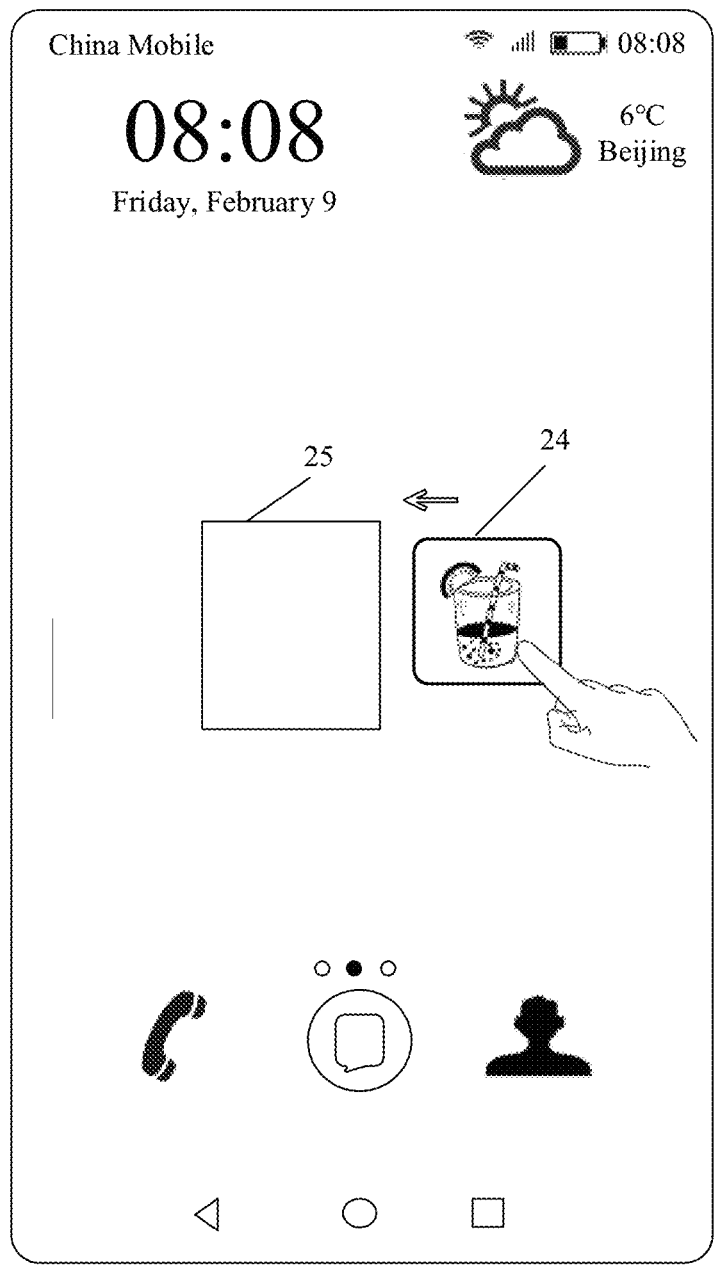
FIG. 13 is a schematic diagram of still another interface for adjusting a size of a dynamic element according to an embodiment of this application.

In this case, the user continues to drag the floating window 24 to the left to make the floating window move from the right to the left. FIG. 13 is a schematic diagram of still another interface for adjusting a size of a dynamic element according to an embodiment of this application. As shown in FIG. 13, it is assumed that in this case, a difference obtained after the horizontal coordinate of the center point of the floating window 24 minus the original horizontal coordinate of the application icon 25 is less than the third parameter and greater than the fourth parameter, that is, $c>x_f-x_{m0}>d$. By using a formula $s=(x_f-x_{m0})*(s_{min}-s_0)/(d-c)+(ds_0-cs_{min})/(d-c)$, the horizontal coordinate of the center point of the floating window 24, the original horizontal coordinate of the application icon 25, the original horizontal size of the application icon 25, the boundary size, the third parameter, and the fourth parameter are calculated, to generate the adjustment horizontal size s of the application icon 25, where the adjustment horizontal size s is the adjustment size information. The size of the application icon 25 is adjusted based on the adjustment horizontal size s, so that the original vertical size of the application icon 25 remains unchanged, and the original horizontal size is reduced to the size of the adjustment horizontal size.

Figure 14:
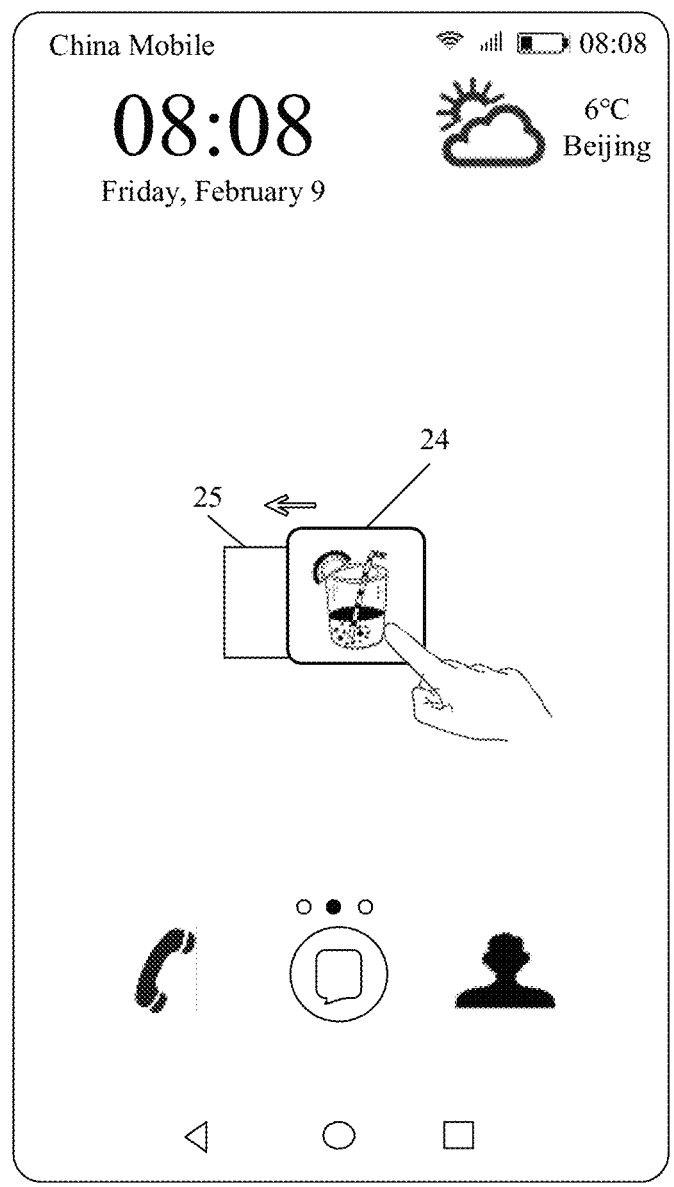
FIG. 14 is a schematic diagram of still another interface for adjusting a size of a dynamic element according to an embodiment of this application.

In this case, the user continues to drag the floating window 24 to the left to make the floating window 24 move from the right to the left. FIG. 14 is a schematic diagram of still another interface for adjusting a size of a dynamic element according to an embodiment of this application. As shown in FIG. 14, it is assumed that in this case, a difference obtained after the horizontal coordinate of the center point of the floating window 24 minus the original horizontal coordinate of the application icon 25 is less than or equal to the fourth parameter and is greater than or equal to an opposite number of the fourth parameter, that is, $d \geq x_f-x_{m0} \geq -d$, in this case, $s=s_{min}$, that is, the boundary size is determined as the adjustment horizontal size of the application icon 25. The adjustment horizontal size s is the adjustment size information. The size of the application icon 25 is adjusted based on the adjustment horizontal size s, so that the original vertical size of the application icon 25 remains unchanged, and the original horizontal size is reduced to the size of the adjustment horizontal size.

Figure 15:
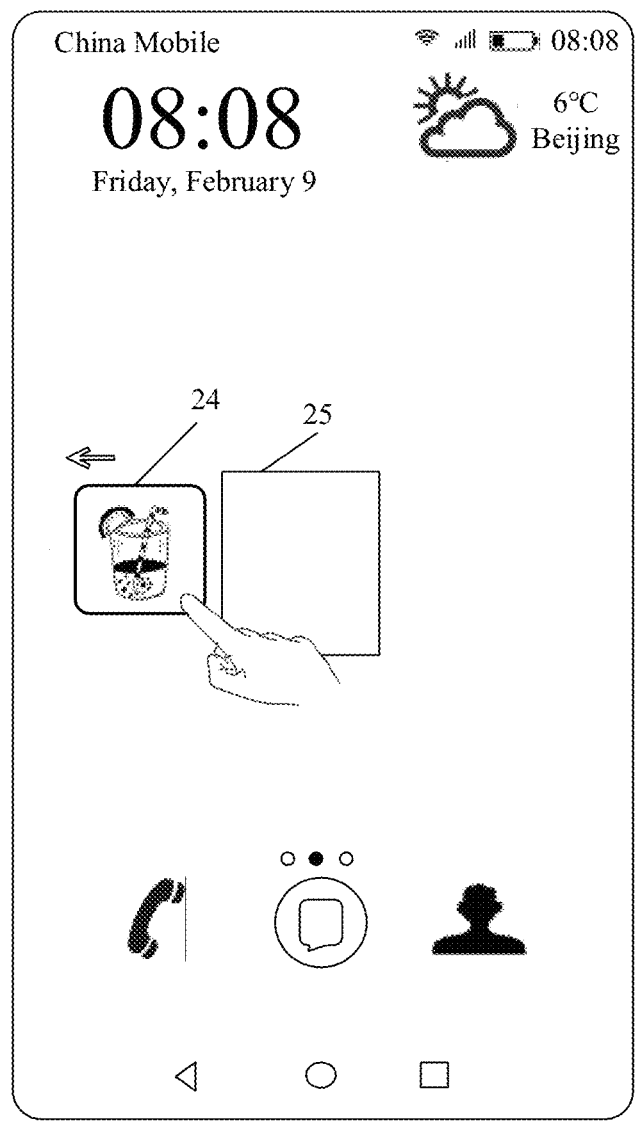
FIG. 15 is a schematic diagram of still another interface for adjusting a size of a dynamic element according to an embodiment of this application.

In this case, the user continues to drag the floating window 24 to the left to make the floating window 24 move from the right to the left. FIG. 15 is a schematic diagram of still another interface for adjusting a size of a dynamic element according to an embodiment of this application. As shown in FIG. 15, it is assumed that in this case, a difference obtained after the horizontal coordinate of the center point of the floating window 24 minus the original horizontal coordinate of the application icon 25 is less than the opposite number of the fourth parameter and greater than an opposite number of the third parameter, that is, $-d>x_f-x_{m0}>-c$. By using a formula $s=(x_f-x_{m0})*(s_{min}-s_0)/(c-d)+(ds_0-cs_{min})/(c-d)$, the horizontal coordinate of the center point of the floating window 24, the original horizontal coordinate of the application icon 25, the original horizontal size of the application icon 25, the boundary size, the third parameter, and the fourth parameter are calculated, to generate the adjustment horizontal size s of the application icon 25, where the adjustment horizontal size s is the adjustment size information. The size of the application icon 25 is adjusted based on the adjustment horizontal size s, so that the original vertical size of the application icon 25 remains unchanged, and the original horizontal size is reduced to the size of the adjustment horizontal size.

Figure 16:
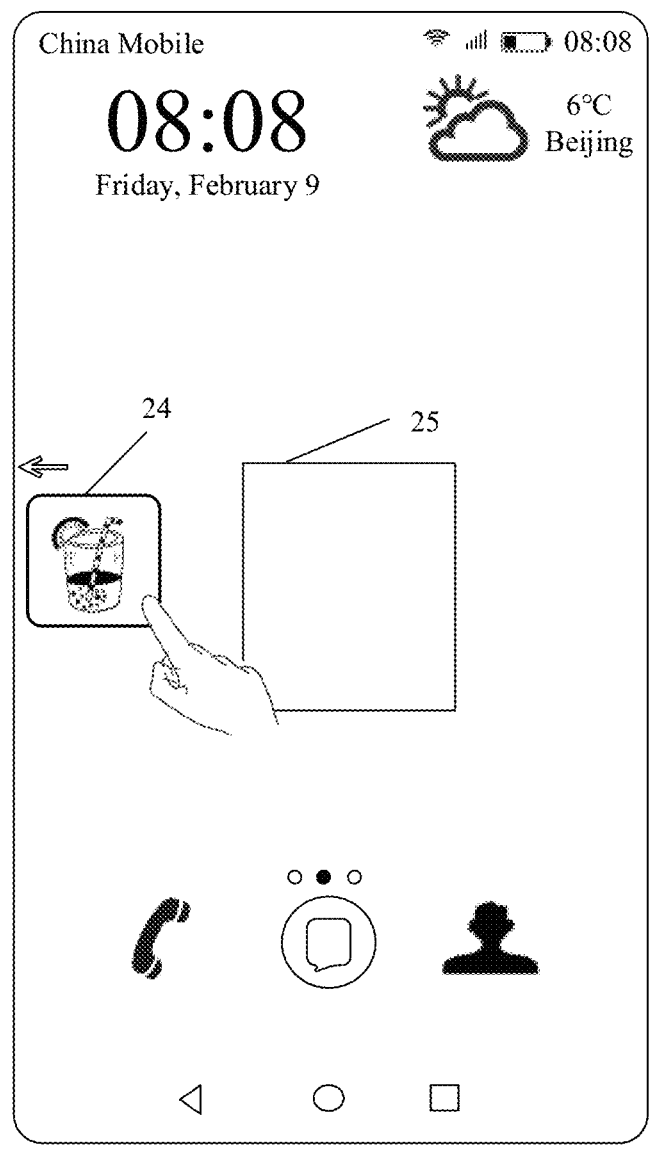
FIG. 16 is a schematic diagram of still another interface for adjusting a size of a dynamic element according to an embodiment of this application.

In this case, the user continues to drag the floating window 24 to the left to make the floating window move from the right to the left. FIG. 16 is a schematic diagram of still another interface for adjusting a size of a dynamic element according to an embodiment of this application. As shown in FIG. 16, it is assumed that in this case, a difference obtained after the horizontal coordinate of the center point of the floating window 24 minus the original horizontal coordinate of the application icon 25 is less than or equal to the opposite number of the third parameter, that is, $x_j-x_{m0} \leq -c$, which indicates that a distance between the floating window 24 and the application icon 25 is long enough. In this case, the floating window 24 does not affect an operation performed by the user on the application icon 25. Therefore, the horizontal size of the application icon 25 remains the original horizontal size, and does not need to be adjusted, that is, $s=s_0$.

Figure 17:
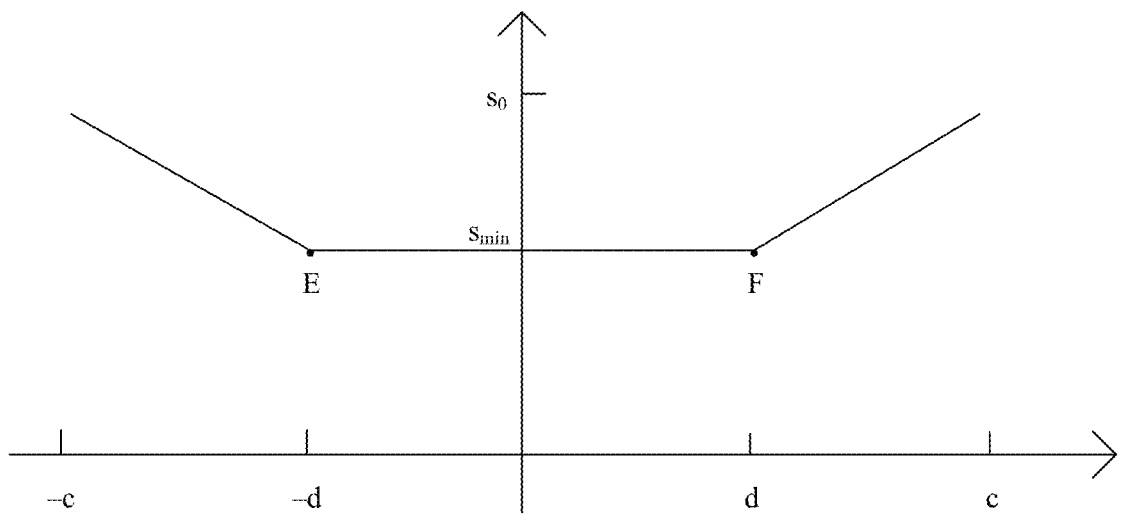
FIG. 17 is a schematic diagram of still another linear function according to an embodiment of this application.

For example, the dynamic element includes the application icon 25. FIG. 17 is a schematic diagram of still another linear function according to an embodiment of this application. As shown in FIG. 17, a horizontal axis of the schematic diagram of the function is a difference obtained after the horizontal coordinate of the center point of the floating window 24 minus the original horizontal coordinate of the application icon 25, and a vertical axis is the adjustment horizontal size of the application icon 25. When the user drags the floating window 24 horizontally to make the floating window 24 move horizontally, if in this case, a difference obtained after the horizontal coordinate of the center point of the floating window 24 minus the original horizontal coordinate of the application icon 25 is greater than the third parameter or less than the opposite number of the third parameter, the horizontal size of the application icon 25 remains the original horizontal size, and does not need to be adjusted. As the user continues to drag the floating window 24 horizontally to make the floating window 24 move horizontally, the application icon 25 moves in a direction away from the floating window 24 until the difference obtained after the horizontal coordinate of the center point of the floating window 24 minus the original horizontal coordinate of the application icon 25 is equal to the fourth parameter or the opposite number of the fourth parameter, and the horizontal size of the application icon 25 reaches the boundary size. As the user continues to drag the floating window 24 horizontally to make the floating window 24 move horizontally, as a blocking area gradually decreases, the horizontal size of the application icon 25 is reset to the original horizontal size, thereby implementing an effect that the application icon 25 dynamically avoids the floating window.

Figure 18:
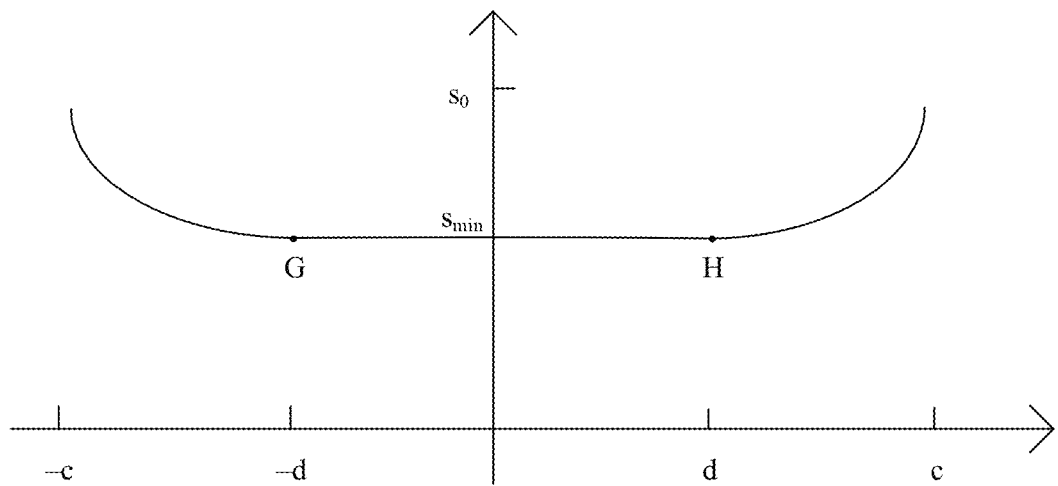
FIG. 18 is a schematic diagram of a sine curve function.
Figure 19:
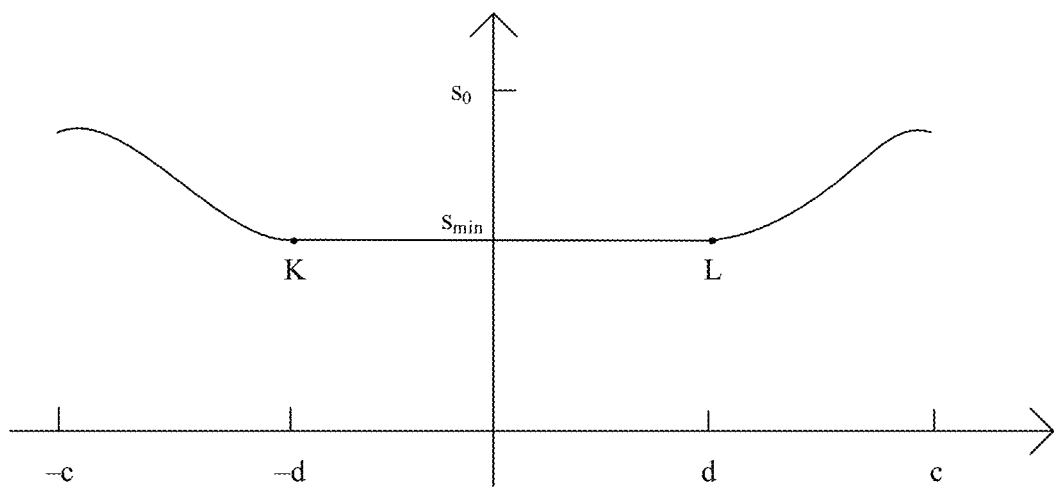
FIG. 19 is a schematic diagram of a Bessel curve function.

Further, transition between a key point E and a key point F in the schematic diagram of the linear function shown in FIG. 17 is relatively sudden. If the floating window 24 continues to move horizontally in this case, the dynamic element suddenly moves horizontally at a specified speed, without a gradual process of changing in the moving speed. To further optimize a control effect of the dynamic element, the sine curve, the Bessel curve, the power function curve, or the exponential function may be used instead of the linear function. For example, FIG. 18 is a schematic diagram of a sine curve function. As shown in FIG. 18, a horizontal axis and a vertical axis of the schematic diagram of the function have same meanings as those of the schematic diagram of the function shown in FIG. 17. Details are not described herein again. Transition between a key point G and a key point H is relatively slow compared with the schematic diagram of the linear function. For example, FIG. 19 is a schematic diagram of the Bessel curve function. As shown in FIG. 19, a horizontal axis and a vertical axis of the schematic diagram of the function have same meanings as those of the schematic diagram of the function shown in FIG. 17 or FIG. 18. Details are not described herein again. Transition between a key point K and a key point L is relatively slow compared with the schematic diagram of the linear function. As the user continues to drag the floating window to make the floating window 24 move horizontally, the dynamic element moves horizontally at a relatively slow speed, and there is a clear buffer process at the moving speed, which can improve user experience.

In this embodiment of this application, for example, FIG. 12 to FIG. 16 are schematic diagrams in which the user drags the floating window 24 to move horizontally. If the user drags the floating window 24 to move vertically, only a vertical size of the dynamic element needs to be calculated, and a horizontal size of the dynamic element does not need to be calculated. A process of determining adjustment size information of the dynamic element is the same as that in FIG. 12 to FIG. 16. Details are not described herein again.

In this embodiment of this application, if the user drags the floating window to move horizontally and vertically, both the vertical size and the horizontal size of the dynamic element need to be calculated, and an adjustment horizontal size and an adjustment vertical size of the dynamic element are separately determined by using a specified function. The adjustment horizontal size and the adjustment vertical size are used as the adjustment size information of the dynamic element, and the size of the dynamic element is adjusted based on the adjustment size information.

In this embodiment of this application, after the adjustment size information is generated, the adjustment size information needs to be compared with the boundary size. Specifically, it is determined whether the adjustment size information is greater than or equal to the boundary size. If it is determined that the adjustment size information is greater than or equal to the boundary size, the size of the dynamic element is adjusted based on the adjustment size information. If it is determined that the adjustment size information is less than the boundary size, the boundary size is determined as the adjustment size information, and the size of the dynamic element is adjusted based on the changed adjustment size information.

In another optional solution, adjustment information of the dynamic element includes the adjustment location information and the adjustment size information. The location of the dynamic element is adjusted based on the adjustment location information, and the size of the dynamic element is adjusted based on the adjustment size information. A process of determining the adjustment location information is the same as that in FIG. 3 to FIG. 7, and details are not described herein again. A process of determining the adjustment size information is the same as that in FIG. 12 to FIG. 16, and details are not described herein again.

Further, in a process of adjusting the location and/or the size of the dynamic element based on the adjustment information of the dynamic element, a neighboring dynamic element of the dynamic element is correspondingly adjusted with the dynamic element. In this embodiment of this application, the neighboring dynamic element may be defined as an element within a specified distance from the dynamic element. For example, an element a is a dynamic element, the element a is used as a center of a circle, the specified distance is used as a radius to draw a circle, and all dynamic elements in the circle are defined as neighboring dynamic elements of the element a. Alternatively, an element that is transmitted only N times may be defined as the neighboring dynamic element. For example, a value of N is set to 2, the element a, an element b, an element c, and an element d are arranged in a straight line, the element a is a dynamic element, the element a is transferred to the element b for only one time, and the element a is transferred to the element c for two times. Therefore, the element b and the element c are neighboring dynamic elements of the element a, and the element d is not a neighboring dynamic element.

Specifically, when the adjustment information of the dynamic element includes the adjustment location information, the location of the neighboring dynamic element is adjusted based on a specified proportion of the adjustment location information. The specified proportion may be set according to an actual situation. For example, the specified proportion is 1 time or 0.5 times. It should be noted that when the specified proportion is 1 time, in this case, adjusting the location of the neighboring dynamic element is adjustment without attenuation, that is, the location of the neighboring dynamic element is adjusted based on the adjustment location information of the dynamic element. When the specified proportion is less than 1 time, for example, when the specified proportion is 0.5 times, in this case, adjusting the location of the neighboring dynamic element is adjustment with attenuation, that is, the location of the neighboring dynamic element is adjusted by 0.5 times based on the adjustment location information of the dynamic element.

Specifically, when the adjustment information of the dynamic element includes the adjustment size information, the size of the neighboring dynamic element is adjusted based on a specified proportion of the adjustment size information. The specified proportion may be set according to an actual situation. For example, the specified proportion is 1 time or 0.5 times. It should be noted that when the specified proportion is 1 time, in this case, adjusting the size of the neighboring dynamic element is adjustment without attenuation, that is, the size of the neighboring dynamic element is adjusted based on the adjustment size information of the dynamic element. When the specified proportion is less than 1 time, for example, when the specified proportion is 0.5 times, in this case, adjusting the size of the neighboring dynamic element is adjustment with attenuation, that is, the size of the neighboring dynamic element is adjusted by 0.5 times based on the adjustment size information of the dynamic element.

Specifically, when the adjustment information of the dynamic element includes the adjustment location information and the adjustment size information, the location of the neighboring dynamic element is adjusted based on the specified proportion of the adjustment location information, and the size of the neighboring dynamic element is adjusted based on the specified proportion of the adjustment size information. A specific adjustment method is the same as that in the foregoing content, and details are not described herein again.

Figure 20:
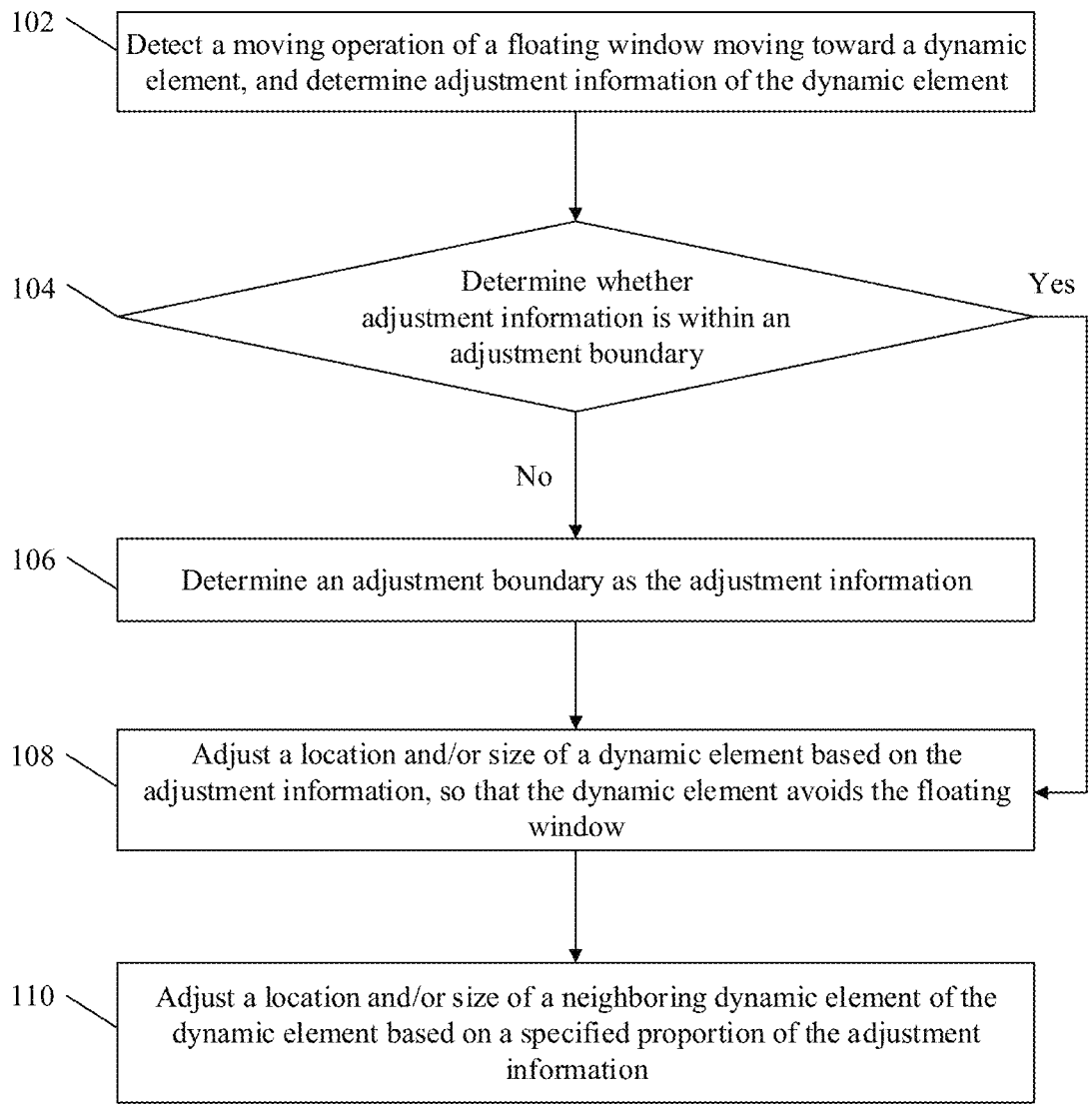
FIG. 20 is a flowchart of a dynamic element control method according to an embodiment of this application.

FIG. 20 is a flowchart of a dynamic element control method according to an embodiment of this application. As shown in FIG. 20, the method includes:

Step 102: Detect a moving operation of a floating window moving toward a dynamic element, and determine adjustment information of the dynamic element.

In this embodiment of this application, the adjustment information includes adjustment location information and/or adjustment size information.

In this embodiment of this application, the adjustment information includes the adjustment location information, and step 102 specifically includes:

Step 1022: Detect the moving operation of the floating window moving toward the dynamic element, and acquire first location information of the floating window and second location information of the dynamic element.

Step 1024: Generate the adjustment location information by using a first specified function and based on a specified first boundary value, a specified second boundary value, a specified first parameter, a specified second parameter, the first location information, and the second location information.

In this embodiment of this application, the first specified function includes a linear function, a sine curve, a Bessel curve, a power function curve, or an exponential function.

In an optional solution, the adjustment information includes the adjustment size information, and step 102 specifically includes:

Step 2022: Detect the moving operation of the floating window moving toward the dynamic element, and acquire the first location information of the floating window, the second location information of the dynamic element, and current size information of the dynamic element.

Step 2024: Generate the adjustment size information by using a second specified function and based on a specified boundary size, a specified third parameter, a specified fourth parameter, the first location information, the second location information, and the current size information.

In this embodiment of this application, the second specified function includes a linear function, a sine curve, a Bessel curve, a power function curve, or an exponential function.

In another optional solution, the adjustment information includes the adjustment location information and the adjustment size information, and step 102 specifically includes:

Step 3022: Detect the moving operation of the floating window moving toward the dynamic element, and acquire the first location information of the floating window, the second location information of the dynamic element, and the current size information of the dynamic element.

Step 3024: Generate the adjustment location information by using the first specified function and based on the specified first boundary value, the specified second boundary value, the specified first parameter, the specified second parameter, the first location information, and the second location information.

In this embodiment of this application, the first specified function includes the linear function, the sine curve, the Bessel curve, the power function curve, or the exponential function.

Step 3036: Generate the adjustment size information by using the second specified function and based on the specified boundary size, the specified third parameter, the specified fourth parameter, the first location information, the second location information, and the current size information.

In this embodiment of this application, the second specified function includes the linear function, the sine curve, the Bessel curve, the power function curve, or the exponential function.

Step 104: Determine whether the adjustment information is within an adjustment boundary. If yes, perform step 108; and if not, perform step 106.

In this embodiment of this application, the adjustment information includes the adjustment location information, and the adjustment boundary includes a first boundary value and a second boundary value. Step 104 specifically includes: determining whether the adjustment location information is greater than or equal to the first boundary value and less than or equal to the second boundary value. If yes, continue to perform step 108; and if not, continue to perform step 106.

In an optional solution, the adjustment information includes the adjustment size information, and the adjustment boundary includes a size boundary. Step 104 specifically includes: determining whether the adjustment size information is greater than or equal to a boundary size. If yes, perform step 108; and if not, perform step 106.

In another optional solution, the adjustment information includes the adjustment location information and the adjustment size information, and the adjustment boundary includes the size boundary, the first boundary value, and the second boundary value. Step 104 specifically includes: determining whether the adjustment size information is greater than or equal to the boundary size and whether the adjustment location information is greater than or equal to the first boundary value, and less than or equal to the second boundary value. If yes, perform step 108; and if not, perform step 106.

Step 106: Determine the adjustment boundary as the adjustment information.

In this embodiment of this application, the adjustment information includes the adjustment location information. If it is determined that the adjustment location information is less than the first boundary value, the first boundary value is determined as the adjustment location information; and if it is determined that the adjustment location information is greater than the second boundary value, the second boundary value is determined as the adjustment location information.

In an optional solution, in this embodiment of this application, the adjustment information includes the adjustment size information. If it is determined that the adjustment size information is less than the boundary size, the boundary size is determined as the adjustment size information.

In another optional solution, in this embodiment of this application, the adjustment information includes the adjustment location information and the adjustment size information. If it is determined that the adjustment location information is less than the first boundary value, the first boundary value is determined as the adjustment location information; if it is determined that the adjustment location information is greater than the second boundary value, the second boundary value is determined as the adjustment location information; and if it is determined that the adjustment size information is less than the boundary size, the boundary size is determined as the adjustment size information.

Step 108: Adjust a location and/or size of the dynamic element based on the adjustment information, so that the dynamic element avoids the floating window.

In this embodiment of this application, the adjustment information includes the adjustment location information. Step 108 specifically includes: adjusting the location of the dynamic element based on the adjustment location information.

In an optional solution, the adjustment information includes the adjustment size information. Step 108 specifically includes: adjusting the size of the dynamic element based on the adjustment size information.

In another optional solution, the adjustment information includes the adjustment location information and the adjustment size information. Step 108 specifically includes: adjusting the location of the dynamic element based on the adjustment location information, and adjust the size of the dynamic element based on the adjustment size information.

Step 110: Adjust a location and/or size of a neighboring dynamic element of the dynamic element based on a specified proportion of the adjustment information.

In this embodiment of this application, the adjustment information includes the adjustment location information. Step 110 specifically includes: adjusting the location of the neighboring dynamic element of the dynamic element based on a specified proportion of the adjustment location information.

In an optional solution, the adjustment information includes the adjustment size information. Step 110 specifically includes: adjust the sizing of the neighboring dynamic element of the dynamic element based on a specified proportion of the adjustment size information.

In another optional solution, the adjustment information includes the adjustment location information and the adjustment size information. Step 110 specifically includes: adjusting the location of the neighboring dynamic element of the dynamic element based on a specified proportion of the adjustment location information, and adjusting the size of the neighboring dynamic element of the dynamic element based on a specified proportion of the adjustment size information.

In this embodiment of this application, a moving operation of a floating window moving toward a dynamic element is detected, and adjustment information of the dynamic element is determined. A location and/or size of the dynamic element is adjusted based on the adjustment information, so that the dynamic element avoids the floating window, which may increase a visible area of the dynamic element, and improve operability of the dynamic element.

It should be understood that the electronic device herein is embodied in a form of a functional unit. The term "unit" herein may be implemented in a form of software and/or hardware, which is not specifically limited. For example, the "unit" may be a software program, a hardware circuit, or a combination thereof that implements the foregoing functions. The hardware circuit may include an application specific integrated circuit (application specific integrated circuit, ASIC), an electronic circuit, a processor (such as a shared processor, a dedicated processor, or a group of processors) configured to execute one or more software or firmware programs, and a memory, a combined logic circuit, and/or another suitable component that supports the described functions.

Therefore, units in the examples described in the embodiments of this application can be implemented by using electronic hardware or a combination of computer software and electronic hardware. Whether these functions are implemented in a form of hardware or software depends on specific application and design constraints of the technical solution. A person skilled in the art may use different methods for each specific application to implement the described functions, but this implementation should not be considered to be beyond the scope of this application.

An embodiment of this application further provides an electronic device. The electronic device may be a terminal device or a circuit device built-in the terminal device. The device may be configured to perform a function/step in the foregoing method embodiment.

Figure 21:
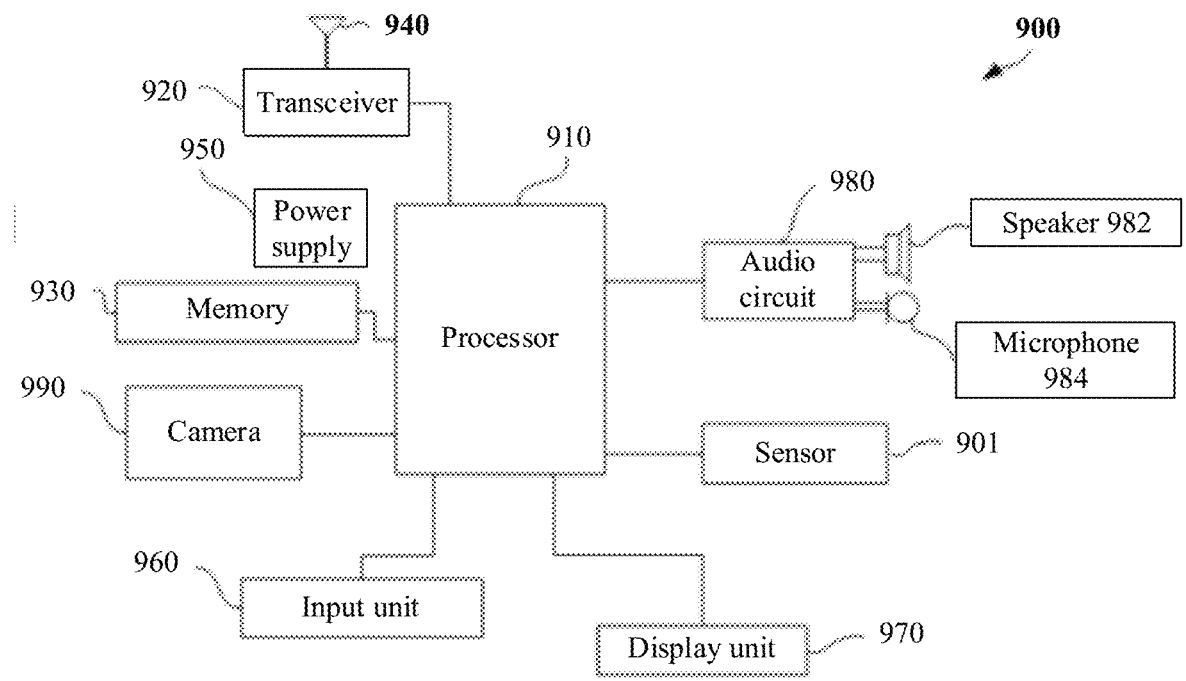
FIG. 21 is a schematic diagram of a structure of an electronic device according to an embodiment of this application.

FIG. 21 is a schematic diagram of a structure of an electronic device according to an embodiment of this application. As shown in FIG. 21, an electronic device 900 includes a processor 910 and a transceiver 920. Optionally, the electronic device 900 may further include a memory 930. The processor 910, the transceiver 920, and the memory 930 may communicate with each other by using an internal connection path, and transmit a control and/or data signal. The memory 930 is configured to store a computer program, and the processor 910 is configured to invoke and run the computer program from the memory 930.

Optionally, the electronic device 900 may further include an antenna 940, configured to send a radio signal output by the transceiver 920.

The processor 910 and the memory 930 may be combined into a processing apparatus, and more commonly, may be components independent from each other. The processor 910 is configured to execute program code stored in the memory 930 to implement the foregoing functions. In specific implementation, the memory 930 may be integrated into the processor 910, or is independent from the processor 910.

In addition, to improve a function of the electronic device 900, the electronic device 900 may further include one or more of an input unit 960, a display unit 970, an audio circuit 980, a camera 990, a sensor 901, and the like. The audio circuit may further include a speaker 982, a microphone 984, and the like. The display unit 970 may include a display screen.

Optionally, the electronic device 900 may further include a power source 950, configured to supply power for various components or circuits in the terminal device.

The input unit 960 is configured to receive a moving operation of a floating window moving toward a dynamic element input by a user, and send the moving operation to the processor 910. The processor 910 is configured to determine adjustment information of the dynamic element, and adjust a location and/or size of the dynamic element based on the adjustment information, so that the dynamic element avoids the floating window. The processor 910 is further configured to adjust a location and/or size of a neighboring dynamic element of the dynamic element based on a specified proportion of the adjustment information.

It should be understood that the electronic device 900 shown in FIG. 21 can implement processes in the method embodiment shown in FIG. 20. Operations and/or functions of units in the electronic device 900 are respectively intended to implement corresponding procedures in the foregoing method embodiments. For details, refer to the description in the foregoing method embodiments. To avoid repetition, detailed description is appropriately omitted herein.

It should be understood that the processor 910 in the electronic device 900 shown in FIG. 21 may be a system on a chip (system on a chip, SOC). The processor 910 may include a central processing unit (central processing unit, CPU), and may further include another type of processor. The CPU may be referred to as a host CPU, and a neural network processing unit NPU 30 is mounted to the host CPU (Host CPU) as a coprocessor, which is allocated a task by the Host CPU. All processors work together to implement the foregoing method procedure, and each of the processors may selectively execute some software driver programs.

In conclusion, processors or processing units in the processor 910 may cooperate with each other to implement the foregoing method procedure, and corresponding software programs of the processors or processing units may be stored in the memory 930.

This application further provides a computer readable storage medium. The computer readable storage medium stores instructions. When the instructions run on a computer, the computer executes each step in the dynamic element control method shown in FIG. 20.

In the foregoing embodiments, the involved processor 910 may include, for example, a central processing unit (central processing unit, CPU), a microprocessor, a microcontroller, or a digital signal processor, and may further include a GPU, an NPU, and an ISP. The processor may further include a necessary hardware accelerator or logic processing hardware circuit, such as an application-specific integrated circuit (application-specific integrated circuit, ASIC), or one or more integrated circuits used to control execution of a technical solution program in this application. In addition, a processor may have a function of operating one or more software programs, and the software programs may be stored in a memory.

The memory may be a read-only memory (read-only memory, ROM), another type of static storage device that can store static information and instructions, a random access memory (random access memory, RAM) or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another optical disc storage, an optical disc storage (including a compressed optical disc, a laser disc, an optical disc, a digital versatile optical disc, a Blu-ray disc, or the like), a magnetic disk storage medium, or another magnetic storage device, or may be any other medium that can be used to carry or store expected program code in a form of an instruction or a data structure and can be accessed by a computer.

In embodiments of this application, "at least one" refers to one or more, and "a plurality of" refers to two or more. "And/or" describes an association relationship of associated objects, indicating that there may be three relationships, for example, A and/or B may indicate that A exists alone, A and B exist simultaneously, and B exists alone. A or B may be singular or plural. The character "I" generally indicates that associated objects are in an "or" relationship. "At least one of the following items" and similar expressions mean any combination of these items, including any combination of a single item or a plurality of items. For example, at least one of a, b, and c may represent a, b, c, a-b, a-c, b-c, or a-b-c, where a, b, and c may be singular or plural.

A person of ordinary skill in the art may recognize that the units and algorithm steps described in embodiments disclosed in this specification can be implemented by combining electronic hardware, computer software and electronic hardware. Whether these functions are implemented in a form of hardware or software depends on specific application and design constraints of the technical solution. A person skilled in the art may use different methods for each specific application to implement the described functions, but this implementation should not be considered to be beyond the scope of this application.

It may be clearly understood by a person skilled in the art that, for convenience and brevity of description, a specific working process of the foregoing described system, apparatus, and unit may be referred to a corresponding process in the foregoing method embodiments, and details are not described herein again.

In several embodiments provided in this application, if implemented in a form of a software functional unit and sold or used as an independent product, any function may be stored in a computer readable storage medium. Based on such an understanding, the technical solutions of this application essentially, or the part contributing to the prior art, or the part of the technical solutions may be implemented in a form of a software product. The computer software product is stored in a storage medium and includes several instructions for instructing a computer device (which may be a personal computer, a server, a network device, or the like) to perform all or a part of steps of the methods described in each embodiment of this application. The foregoing storage medium includes a USB flash drive, a removable hard disk, a read-only memory (read-only memory, ROM), a random access memory (random access memory, RAM), a magnetic disk, or an optical disc, or each media that can store program code.

The foregoing descriptions are merely specific implementations of this application, and any change or replacement readily figured out by a person skilled in the art within the technical scope disclosed in this application shall fall within the protection scope of this application. The protection scope of this application shall be subject to the protection scope of the claims.

What is claimed is:

1. A dynamic element control method, comprising:
    detecting a moving operation of a floating window moving toward a dynamic element;
    determining adjustment information of the dynamic element, wherein determining the adjustment information comprises:
        acquiring first location information of the floating window and second location information of the dynamic element, and
        generating adjustment location information of the adjustment information by using a first specified function, and based on a specified first boundary value, a specified second boundary value, a specified first parameter, a specified second parameter, the first location information, and the second location information; and
    adjusting at least one of a location or size of the dynamic element based on the adjustment information, so that the dynamic element avoids the floating window.

2. The method according to claim 1, wherein the first specified function comprises a linear function, a sine curve, a Bessel curve, a power function curve, or an exponential function.

3. The method according to claim 1, wherein the adjustment information further comprises adjustment size information; and
    the determining adjustment information of the dynamic element further comprises:
    acquiring current size information of the dynamic element; and
    generating the adjustment size information by using a second specified function and based on a specified boundary size, a specified third parameter, a specified fourth parameter, the first location information, the second location information, and the current size information.

4. The method according to claim 3, wherein the second specified function comprises a linear function, a sine curve, a Bessel curve, a power function curve, or an exponential function.

5. The method according to claim 1, wherein the specified first boundary value is less than the specified second boundary value; and
    before the adjusting at least one of the location or size of the dynamic element based on the adjustment information, the method further comprises:
    determining whether the adjustment location information is greater than or equal to the specified first boundary value and less than or equal to the specified second boundary value; and
    if it is determined that the adjustment location information is greater than or equal to the specified first boundary value and less than or equal to the specified second boundary value, continuing to perform the adjusting of the at least one of the location or size of the dynamic element based on the adjustment information.

6. The method according to claim 5, further comprising:
    if it is determined that the adjustment location information is less than the specified first boundary value, determining the specified first boundary value as the adjustment location information, and continuing to perform the adjusting of the at least one of the location or size of the dynamic element based on the adjustment information.

7. The method according to claim 5, further comprising:
    if it is determined that the adjustment location information is greater than the specified second boundary value, determining the specified second boundary value as the adjustment location information, and continuing to perform the adjusting of the at least one of the location or size of the dynamic element based on the adjustment information.

8. The method according to claim 3, wherein
    before the adjusting at least one of the location or size of the dynamic element based on the adjustment information, the method further comprises:
    determining whether the adjustment size information is greater than or equal to the specified boundary size; and
    if it is determined that the adjustment size information is greater than or equal to the specified boundary size, continuing to perform the adjusting of the at least one of the location or size of the dynamic element based on the adjustment information.

9. The method according to claim 8, further comprising:
    if it is determined that the adjustment size information is less than the specified boundary size, determining the specified boundary size as the adjustment size information, and continuing to perform the adjusting of the at least one of the location or size of the dynamic element based on the adjustment information.

10. An electronic device, comprising:
    a display screen; one or more processors; a memory; and one or more computer programs, wherein the one or more computer programs are stored in the memory, the one or more computer programs comprise instructions, and when the instructions are executed by the device, the device performs following steps:
    detecting a moving operation of a floating window moving toward a dynamic element;
    determining adjustment information of the dynamic element, wherein determining the adjustment information comprises:
        acquiring first location information of the floating window, second location information of the dynamic element, and current size information of the dynamic element, and
        generating adjustment size information of the adjustment information by using a first specified function and based on a specified boundary size, a specified first parameter, a specified second parameter, the first location information, the second location information, and the current size information; and
    adjusting at least one of a location or size of the dynamic element based on the adjustment information, so that the dynamic element avoids the floating window.

11. The device according to claim 10, wherein the adjustment information further comprises adjustment location information; and
    when the instructions are executed by the device, the device performs following steps:

generating the adjustment location information by using a second specified function and based on a specified first boundary value, a specified second boundary value, a specified third parameter, a specified fourth parameter, the first location information, and the second location information.

12. The device according to claim 11, wherein the specified first boundary value is less than the specified second boundary value; and
when the instructions are executed by the device, the device performs following steps:
determining whether the adjustment location information is greater than or equal to the specified first boundary value and less than or equal to the specified second boundary value; and
if it is determined that the adjustment location information is greater than or equal to the specified first boundary value and less than or equal to the specified second boundary value, continuing to perform the adjusting of the at least one of the location or size of the dynamic element based on the adjustment information.

13. The device according to claim 12, wherein when the instructions are executed by the device, the device performs following step:
if it is determined that the adjustment location information is less than the specified first boundary value, determining the specified first boundary value as the adjustment location information, and continuing to perform the adjusting of the at least one of the location or size of the dynamic element based on the adjustment information.

14. The device according to claim 12, wherein when the instructions are executed by the device, the device performs following step:
if it is determined that the adjustment location information is greater than the specified second boundary value, determining the specified second boundary value as the adjustment location information, and continuing to perform the adjusting of the at least one of the location or size of the dynamic element based on the adjustment information.

15. The device according to claim 10, wherein when the instructions are executed by the device, the device performs following steps:
determining whether the adjustment size information is greater than or equal to the specified boundary size; and
if it is determined that the adjustment size information is greater than or equal to the specified boundary size, continuing to perform the adjusting of the at least one of the location or size of the dynamic element based on the adjustment information.

16. The device according to claim 15, wherein when the instructions are executed by the device, the device performs following step:
if it is determined that the adjustment size information is less than the specified boundary size, determining the specified boundary size as the adjustment size information, and continuing to perform the adjusting of the at least one of the location or size of the dynamic element based on the adjustment information.

17. The device according to claim 10, wherein when the instructions are executed by the device, the device performs following step:
adjusting at least one of the location or size of a neighboring dynamic element of the dynamic element based on a specified proportion of the adjustment information.

18. A non-transitory computer readable storage medium, wherein the non-transitory computer readable storage medium comprises a stored program, and when the stored program is running, a device in which the non-transitory computer readable storage medium is located is controlled to execute following steps:
detecting a moving operation of a floating window moving toward a dynamic element;
determining adjustment information of the dynamic element, wherein determining the adjustment information comprises:
acquiring first location information of the floating window and second location information of the dynamic element, and
generating adjustment location information of the adjustment information using a first specified function, and based on a specified first boundary value, a specified second boundary value, a specified first parameter, a specified second parameter, the first location information, and the second location information; and
adjusting at least one of a location or size of the dynamic element based on the adjustment information, so that the dynamic element avoids the floating window.

19. The non-transitory computer readable storage medium according to claim 18, wherein the adjustment information further comprises adjustment size information; and
the determining adjustment information of the dynamic element further comprises:
acquiring current size information of the dynamic element; and
generating the adjustment size information by using a second specified function and based on a specified boundary size, a specified third parameter, a specified fourth parameter, the first location information, the second location information, and the current size information.

20. The non-transitory computer readable storage medium according to claim 19, wherein the second specified function comprises a linear function, a sine curve, a Bessel curve, a power function curve, or an exponential function.

* * * * *